US012293617B2

United States Patent
Nistler et al.

(10) Patent No.: US 12,293,617 B2
(45) Date of Patent: *May 6, 2025

(54) VEHICLE INSPECTION SYSTEM

(71) Applicant: TRANSPORTATION IP HOLDINGS, LLC, Norwalk, CT (US)

(72) Inventors: Paul Gerard Nistler, Lawrence Park, PA (US); Michael Altonji, Erie, PA (US); Glenn Robert Shaffer, Lawrence Park, PA (US); David Joseph Schroeck, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 243 days.

This patent is subject to a terminal disclaimer.

(21) Appl. No.: 17/873,394

(22) Filed: Jul. 26, 2022

(65) Prior Publication Data

US 2022/0366736 A1    Nov. 17, 2022

Related U.S. Application Data

(63) Continuation-in-part of application No. 15/949,375, filed on Apr. 10, 2018, now Pat. No. 11,429,100.

(Continued)

(51) Int. Cl.
*G07C 5/08* (2006.01)
*B60W 60/00* (2020.01)
*G07C 5/00* (2006.01)

(52) U.S. Cl.
CPC .......... *G07C 5/0808* (2013.01); *B60W 60/00* (2020.02); *G07C 5/006* (2013.01); *G07C 5/008* (2013.01)

(58) Field of Classification Search
CPC ...... G07C 5/0808; G07C 5/006; G07C 5/008; B60W 60/00
(Continued)

(56) References Cited

U.S. PATENT DOCUMENTS

| 2009/0132179 A1* | 5/2009 | Fu ..................... G01M 99/007 702/34 |
| 2012/0046826 A1* | 2/2012 | Panko ................ G07C 5/0858 702/81 |

(Continued)

OTHER PUBLICATIONS

Second Office Action for corresponding CN Application No. 201810394120.2 dated Mar. 1, 2023 (8 pages).

(Continued)

*Primary Examiner* — Mahmoud S Ismail
(74) *Attorney, Agent, or Firm* — K&L Gates LLP

(57) ABSTRACT

An inspection system includes sensors that are selectively coupled to a vehicle during an inspection and/or maintenance event for the vehicle and a controller that is operable to cause a control system of the vehicle to initiate a first operation and a different, second operation. The controller determines whether first sensor information indicative of a state of the vehicle during the first operation exists. The controller sends a command signal to the control system to direct the control system to change vehicle operations from the first operation to the second operation responsive to determining that the first sensor information is lacking. The controller obtains second sensor information from the sensors based on the second operation and determines a condition of the vehicle based on the first and/or second sensor information.

20 Claims, 6 Drawing Sheets

Related U.S. Application Data

(60) Provisional application No. 62/491,840, filed on Apr. 28, 2017.

(58) Field of Classification Search
USPC .......................................................... 701/24
See application file for complete search history.

(56) References Cited

U.S. PATENT DOCUMENTS

| | | | |
|---|---|---|---|
| 2014/0088801 A1 | 3/2014 | Bartonek | |
| 2016/0090111 A1 | 3/2016 | Miller et al. | |
| 2016/0292931 A1* | 10/2016 | Chundru | G07C 5/085 |
| 2017/0129514 A1* | 5/2017 | Shubs, Jr. | B61L 27/04 |
| 2017/0200325 A1* | 7/2017 | Kumar | G07C 5/0808 |
| 2017/0345227 A1* | 11/2017 | Allen, Jr. | G06F 16/951 |
| 2018/0142543 A1* | 5/2018 | Gupta | E21B 33/064 |

OTHER PUBLICATIONS

Examination Report No. 1 for corresponding AU Application No. 2018202836 dated Jun. 14, 2023 (4 pages).

* cited by examiner

VEHICLE INSPECTION SYSTEM

CROSS-REFERENCE TO RELATED APPLICATIONS

This application is a continuation-in-part of U.S. patent application Ser. No. 15/949,375, filed 10 Apr. 2018, which claims priority to U.S. Provisional Application No. 62/491,840, filed 28 Apr. 2017. The entire disclosures of which are incorporated herein by reference.

FIELD

The inventive subject matter described herein relates to inspecting vehicle systems.

BACKGROUND

Maintaining the health of a vehicle is important to the safety and longevity of a vehicle. Routine maintenance is performed to ensure that components and systems of the vehicles are functioning properly. Over time, vehicle systems and components may become damaged and/or fail. Some vehicles may respond to failure by stopping movement of the vehicle, not performing at peak performance, or the like. Alternatively, damaged and/or failed vehicle systems and components may lead to catastrophic results leading to significant financial losses, loss of life, or the like.

The vehicles may be manually inspected to diagnose the health of the vehicle and to maintain the health of the vehicle systems and components. When inspected, either for routine maintenance or as a result of a failure, vehicles may be taken to a repair center where a maintenance operator is provided a given set of troubleshooting instructions. These instructions can take a significant amount of time to complete with many tasks and steps to complete. Additionally, some tasks are difficult for the maintenance operator to execute because they require additional measurement equipment, are tedious to perform (e.g., if a specific execution sequence is essential), or may place the maintenance operator at an elevated risk (e.g., taking engine measurements near the engine while the engine is operating).

BRIEF DESCRIPTION

In accordance with one aspect or example, an inspection system may include one or more sensors that are selectively coupled to a vehicle during one or more of an inspection event or a maintenance event for the vehicle and a controller that is operable to cause a control system of the vehicle that controls plural operations of the vehicle to initiate a first operation and a different, second operation of the plural operations of the vehicle. The controller may determine whether the control system of the vehicle has first sensor information indicative of a state of the vehicle during the first operation of the vehicle. The controller may send a command signal to the control system of the vehicle in order to direct the control system of the vehicle to change vehicle operations from the first operation to the second operation of the vehicle responsive to determining that the control system lacks the first sensor information that was requested. The controller may obtain second sensor information from the one or more sensors based on the second operation of the vehicle and determines a condition of one or more components of the vehicle based on the first sensor information and the second sensor information.

In accordance with one aspect or example, a method may include selectively coupling one or more sensors of an inspection system to a vehicle during one or more of an inspection event or a maintenance event for the vehicle. The method may include operably coupling a controller with the one or more sensors of the inspection system wherein the controller is operable to cause a control system of the vehicle to initiate a first operation of the vehicle and a different, second operation of the vehicle. During the first operation of the vehicle it may be determined whether the control system of the vehicle has first sensor information indicative of a state of the vehicle. Responsive to determining that the control system lacks the first sensor information, the controller may send a command signal to the control system of the vehicle in order to direct the control system of the vehicle to change vehicle operations from the first operation to the second operation of the vehicle. Second sensor information may be obtained from the one or more sensors based on the second operations of the vehicle. A condition of one or more components of the vehicle may be determined based on the first sensor information and the second sensor information.

In accordance with one aspect or example, a system may include a first sensor configured to determine an operating characteristic of a vehicle and a second sensor configured to determine one or more of an externality characteristic of the first sensor or an externality characteristic of the vehicle. The externality characteristic of the first sensor may be representative of one or more external conditions to which the first sensor is exposed. The externality characteristic of the vehicle may be representative of one or more external conditions to which the vehicle is exposed. The system may include a controller that may diagnose an operational state of the vehicle based on the operating characteristic of the vehicle and based on the one or more of the externality characteristic of the first sensor or the externality characteristic of the vehicle In accordance with one aspect or example, an inspection system may include one or more sensors that may be selectively coupled to a vehicle during an inspection event and/or a maintenance event for the vehicle. A controller may be transferably coupled with a control system of the vehicle during the inspection and/or maintenance event. The controller may control one or more settings of the control system to initiate one or more of plural operations of the vehicle. The controller may determine whether first sensor information exists. The first sensor information may be indicative of a state of the vehicle during a time outside of the inspection and/or maintenance events. The controller may send a command signal to the control system to direct the control system of the vehicle to initiate a second operation of the vehicle responsive to determining that the first sensor information is lacking. The controller may obtain second sensor information from the one or more sensors based on the second operation of the vehicle, and determine a condition of the vehicle based on one or more of the first sensor information or the second sensor information.

In accordance with one aspect or example, a method may include selectively coupling one or more sensors to a vehicle during an inspection event and/or a maintenance event for the vehicle. A controller may be operably coupled with a control system of the vehicle during the inspection and/or maintenance event. The controller may control one or more settings of the control system to initiate one or more of plural operations of the vehicle. It may be determined whether first sensor information, indicative of a state of the vehicle during a time outside of the inspection and/or maintenance event exists. A command signal may be sent to the control system to direct the control system to initiate a second operation of the vehicle responsive to determining that the first sensor information is lacking. Second sensor information may be obtained from the one or more sensors based on the second operation of the vehicle. A condition of the vehicle may be determined based on one or more of the first sensor information or the second sensor information.

In accordance with one aspect or example, a system may include a first sensor that may detect first sensor information and determine an operating characteristic of a vehicle during a first operation of the vehicle based at least in part on the first sensor information. A control system of the vehicle may initiate the first operation of the vehicle. The first sensor information may be stored onboard or off-board the vehicle. A second sensor may detect second sensor information and determine one or more of an externality characteristic of the first sensor or an externality characteristic of the vehicle during the first operation of vehicle or during a second operation of the vehicle based at least in part on the second sensor information. A controller that is transferably coupled with the control system may initiate the second operation of the vehicle during an inspection and/or maintenance event. The first operation of the vehicle may occur at a time outside of the inspection and/or maintenance event. The controller may diagnose an operational state of the vehicle based on the operating characteristic of the vehicle, and based on the externality characteristic of the first sensor and/or the externality characteristic of the vehicle.

BRIEF DESCRIPTION OF THE DRAWINGS

Reference is now made briefly to the accompanying drawings, in which.

DETAILED DESCRIPTION

Figure 1:
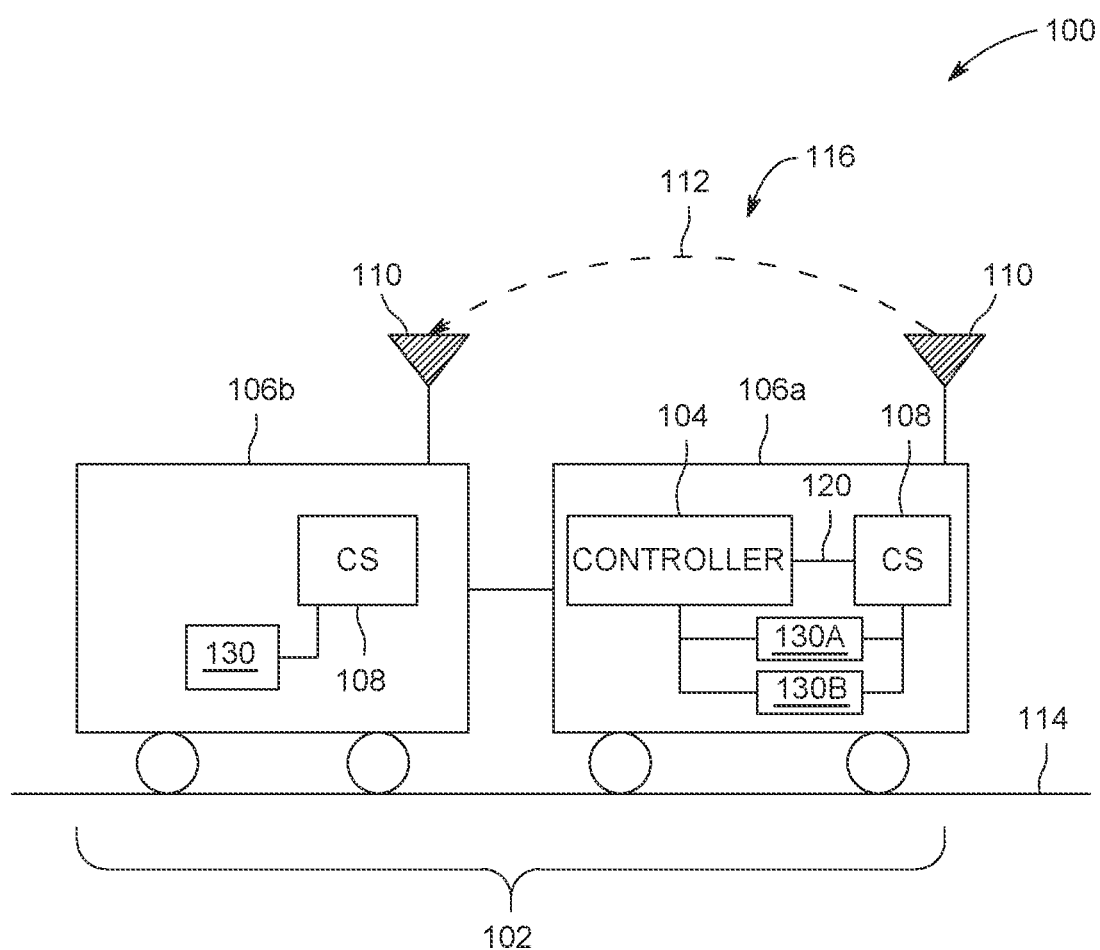
FIG. 1 illustrates a schematic illustration of an inspection system of a vehicle system in accordance with one embodiment.

One or more embodiments of the inventive subject matter described herein relate to systems and methods that inspect a vehicle in order to diagnose a condition and the health of the vehicle. The systems and methods include a controller that is transferably coupled with a control system onboard the vehicle that controls operation of the vehicle. For example, the controller may be transferred between off-board and onboard the vehicle, wherein the controller is coupled with the control system when the controller is transferred onboard the vehicle. One or more processors of the controller may determine whether the control system has sensor information indicative of a state of the vehicle. Optionally, one or more sensor systems coupled with the controller, coupled with the control system, coupled with the vehicle, or the like, may have sensor information of the control system.

Responsive to determining that the control system lacks the sensor information, the one or more processors send a command signal to the control system instructing the control system of the vehicle to perform one or more operations. For example, the command signal instructs the control system to perform one or more operations in order for the controller to obtain sensor information based on the performance of operations by the vehicle. Using the sensor information and/or the status data obtained by the performance of operations by the vehicle, the one or more processors of the controller determines a condition of the vehicle. For example, the controller may autonomously and/or semi-autonomously determine an operational state, a fault state, a damaged state, or the like, of one or more components of the vehicle.

In one or more embodiments, the systems and methods include a first sensor system and a second sensor system. The first and second sensor systems may be operably coupled with one or more of the control system of the vehicle or with the controller. The first sensor system is configured to determine an operating characteristic of the vehicle, and second sensor system is configured to determine an externality characteristic of the first sensor system or an externality characteristic of the vehicle. For example, the externality characteristic of the first sensor system may represent an external condition to which the first sensor system is exposed to. The externality characteristic of the vehicle may represent an external condition to which the vehicle is exposed to. Using the operating characteristic of the vehicle determined by the first sensor system, the externality characteristic of the first sensor system determined by the second sensor system, the externality characteristic of the vehicle determined by the second sensor system, or any combination therein, the controller diagnoses an operational state of the vehicle. For example, the controller may autonomously and/or semi-autonomously diagnose an operational state, a fault state, a damaged state, a health score, or the like, of one or more components and or one or more systems of the vehicle.

While one or more embodiments are described in connection with a rail vehicle system, not all embodiments are limited to rail vehicle systems. Unless expressly disclaimed or stated otherwise, the inventive subject matter described herein extends to multiple types of vehicle systems. These vehicle types may include automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together as a group. Vehicle groups may be referred to as a convoy, consist, swarm, fleet, platoon, and train.

FIG. 1 illustrates one embodiment of an inspection system 100 used to determine a condition of one or more vehicles 106 of a vehicle system 102. The illustrated vehicle system 102 includes propulsion-generating vehicles 106A, 106B that travel together along a route 114. Although the vehicles 106 are shown as being mechanically coupled with each other, optionally the vehicles may not be mechanically coupled with each other. Instead, the vehicles can communicate with each other (while remaining mechanically separate) in order to coordinate the movements of the vehicles with each other so the vehicles travel together along the routes.

The propulsion-generating vehicles 106A, 106B are shown as locomotives and the vehicle system 102 is shown as a train in the illustrated embodiment. Alternatively, the vehicles 106 may represent other vehicles such as automobiles, rail vehicles, marine vessels, mining vehicles, aerial droves, other aerial vehicles, or the like and the vehicle system 102 can represent a grouping or coupling of these vehicles. The number and arrangement of the vehicles 106 in the vehicle system 102 is provided as one example and is not intended as a limitation on all embodiments of the subject matter described herein.

The propulsion-generating vehicles 106 can be arranged in a distributed power (DP) arrangement. For example, the vehicle system 102 can include a first vehicle 106A that issues control signals to a second vehicle 106B. The designations "first" and "second" are not intended to denote spatial locations of the propulsion-generating vehicles 106 in the vehicle system 102, but instead are used to indicate which propulsion-generating vehicle 106 is communicating (e.g., transmitting, broadcasting, or a combination of transmitting and broadcasting) control signals and which propulsion-generating vehicle 106 is being remotely controlled using the control signals. For example, the first vehicle 106A may or may not be disposed at a front end of the vehicle system 102 (e.g., along a direction of travel of the vehicle system 102). Additionally, the remote second vehicle 106B need not be separated from the first vehicle 106A or may be separated from the first vehicle 106A by one or more other propulsion-generating vehicles 106 and/or non-propulsion-generating vehicles.

The control signals issues by the first vehicle 106A to the second vehicle 106B may include directives that direct operations of the remote second vehicle 106B. These directives can include propulsion commands that direct propulsion subsystems of the second vehicle 106B to move at a designated speed and/or power level, brake commands that direct the second vehicle to apply brakes at a designated level, and/or other commands, or the like. The first vehicle 106A issues the control signals to coordinate the tractive efforts and/or braking efforts provided by the propulsion-generating vehicle 106B in order to propel the vehicle system 102 along the route 114, such as a track, road, waterway, or the like.

The control signals can be communicated using a communication system 116. In one or more embodiment, the control signals are wirelessly communicated using the communication system 116. The communication system 116 may include one or more components onboard the propulsion-generating vehicles 106 that are used to establish a communication link 112 between the vehicles 106 in the vehicle system 102.

The communication system 116 may include wireless transceiving hardware and circuitry (e.g., antennas 110) disposed onboard the propulsion-generating vehicles 106. For example, the second vehicle 106B may be remotely controlled by the first vehicle 106A by the communication link 112 established between the first and second vehicles 106A, 106B. Additionally or alternatively, the propulsion-generating vehicles 106 may be communicatively linked through a wired connection between one or more of the propulsion-generating vehicles 106 or non-propulsion-generating vehicles.

The propulsion-generating vehicles 106A, 106B each include a control system 108 disposed onboard the vehicles 106. The control system 108 can include hardware circuits or circuitry that include and/or are connected with one or more processors that perform the operations described herein in connection with the control system 108. The control system 108 can control or limit movement of the vehicles 106 and/or the vehicle system 102 based on one or more limitations. For example, the control system 108 can prevent the vehicles 106 from entering a restricted area, can prevent the vehicles 106 from exiting a designated area, can prevent the vehicles 106 from traveling at a speed that exceeds an upper speed limit, can prevent the vehicles from traveling at a speed less than a lower speed limit, can instruct the vehicles 106 to travel according to a designated trip plan generated by an energy management system, can control one or more of a throttle setting, brake setting, speed setting, radiator fan speed, pump speed, coolant flow rate, or the like of the vehicles. For example, the control system 108 may monitor and/or control operations of a cooling system of the vehicles such as increase, decrease, stop, limit, or the like, the amount of coolant (e.g., air or liquid coolant) that flows through the cooling system of the vehicle 106. The control system 108 will be discussed in more detail below with FIG. 2.

The inspection system 100 includes a controller 104 that is transferably coupled with the control system 108 of one or more of the vehicles 106. For example, the controller 104 may be coupled with (e.g., connected to, plugged into) the control system 108 of the first vehicle 106A, subsequently uncoupled with (e.g., disconnected, unplugged) the control system 108 of the first vehicle 106A, and then subsequently coupled with (e.g., connected to, plugged into) one or more of the control system 108 of the second vehicle 106B, an alternative vehicle system, or the like. The controller 104 is off-board the vehicle system 102 during movement of the vehicle system 102. For example, the controller 104 is off-board the vehicle 106 and/or the vehicle system 102 when the vehicle system 102 is traveling along the route 114 from a first location to a different, second location (e.g., during typical transit of the vehicle system 102). Alternatively, the controller 104 is transferred to be onboard the vehicle 106 and/or vehicle system 102 during alternative movement of the vehicle system 102. For example, the controller 104 may be transferred from off-board the vehicle 106 to onboard the vehicle 106 when the vehicle 106 or vehicle system 102 has slowed, has come to a stop, has been forced to a stop due to a fault of the vehicle, or the like. For example, the controller 104 may be transferred to be onboard the vehicle 106 at a vehicle repair center, or the like.

The controller 104 is operably coupled with the control system 108 for an inspection event or a maintenance event for the one or more vehicles 106 of the vehicle system 102. The inspection event may include inspection of one or more components of the vehicle 106 (e.g., radiator fans, pumps, heat exchangers, compressors, or the like), one or more systems of the vehicle 106 (braking system, cooling system, propulsion subsystem, communication systems, or the like). For example, one or more components, one or more systems, or a combination of one or more components and/or systems therein, may need to be inspected by the controller 104 of the inspection system 100 in order to determine an operational state, a fault state, a damaged state, a health score, a condition, or the like, of the components and/or systems of the vehicle system 102. The maintenance event may include maintenance (e.g., repair, replacement, or the like) of a component of the vehicle 106 and/or of a system of the vehicle 106. For example, one or more components, one or more systems, or a combination of one or more components and/or systems therein, may need to be repaired based on a condition of the components and/or systems determined by the controller 104.

The controller 104 may communicate with the control system 108 via a wireless communication link, a wired connection, or the like, during the inspection event and/or during the maintenance event. For example, in the illustrated embodiment of FIG. 1, the controller 104 is disposed onboard the vehicle 106 during the inspection event, and may communicate with the control system 108 via a wired connection. Additionally or alternatively, the controller 104 may be disposed off-board the vehicle 106 during the inspection and/or maintenance event and may communicate with the control system 108 via a wireless connection. Optionally, the controller 104 may be disposed off-board the vehicle 106 during a first inspection event, and may be subsequently disposed onboard the vehicle 106 during the same, first inspection event. The controller 104 may be transferable between onboard and off-board the vehicle 106 during inspection, maintenance, or the like, of the vehicle system 102. For example, the controller 104 may be a laptop computer, a tablet computer, or an alternative cordless device, that may be operably coupled with the control system 108 when the controller 104 is onboard the vehicle, may be operably coupled with an external sensor that is transferable between off-board and onboard the vehicle 106 (e.g., an inspection sensor system that is operably coupled to the vehicle during inspection and/or maintenance of the vehicle), or the like. Alternatively or additionally, the controller may be one or more of: handheld; portable; battery powered; powered via a removable power cord that is connectable to an external power source; both battery powered and powered via a power cord; and/or communicatively connectable to a vehicle (for transmitting and receiving signals from the vehicle) via wireless and/or wired connections, e.g., Ethernet.

The controller 104 controls movement of the vehicle 106 with the control system 108 during the inspection event and/or maintenance event. For example, the controller 104 may selectively over-ride, take control of, or the like, one or more settings of the control system 108 that control operations and/or movement of the vehicle 106 when the controller 104 is coupled with the control system 108. Additionally or alternatively, the controller 104 may not control movement of the vehicle 106 with the control system 108 during the inspection event and/or maintenance event. For example, the controller 104 may inspect and/or maintain the vehicle 106 while the vehicle 106 travels along the route 114. The controller 104 sends one or more command messages to the control system 108 in order to obtain sensor information indicative of a state of the vehicle 106 in order to determine a condition of the vehicle 106. Additionally or alternatively, the controller 104 may be operably coupled with the control system 108 in order to control one or more operations of the vehicle 106 in order to obtain sensor information indicative of a state of the vehicle 106 in order to determine the condition of the vehicle. The controller 104 will be discussed in more detail below with FIG. 3.

The inspection system 100 includes one or more control system sensors 230 that are maintained at a position onboard the vehicle 106. The control system sensors 230 are operably coupled with the controller 104 and/or with the control system 108. For example, the vehicle 106 may have control system sensors that are not transferable between onboard and off-board the vehicle 106. For example, the one or more control system sensors may be fixed onboard the vehicle 106 and sense information (e.g., monitor, gather, measure, collect, read, or the like) of systems of the vehicle (e.g., the propulsion subsystem, an energy-management system, or the like) and/or components of the vehicle during movement of the vehicle 106 (e.g., during a trip). The control system sensors 230 will be described in more detail below.

The inspection system 100 includes one or more external sensor systems 130 that are selectively coupled to the vehicle 106 during an inspection event and/or a maintenance event of the vehicle 106 in accordance with one embodiment. The external sensor systems 130 may sense temperature, pressure, vibrations, fluid flow rates, gas flow rates, visually inspect via a camera, audio inspect via a microphone, or the like. For example, the external sensor systems 130 may be coolant temperature sensors, manifold absolute pressure sensors, air flow meters, or the like, configured to sense (e.g., monitor, gather, measure, read, collect, or the like) information that is indicative of the state of the vehicle 106, the state of one or more components of the vehicle, and/or the state of one or more systems or the vehicle. One example of a configuration of the external sensor systems 130 is described below with FIGS. 4 and 5.

The external sensor system 130A may be a first external sensor system, and the external sensor system 130B may be a second external sensor system. The designations "first" and "second" are not intended to be spatial locations of the external sensor systems 130, but instead are used to indicate which external sensor system may have first sensor information and which external sensor system may have second sensor information. The first and/or second external sensor systems 130A, 130B are selectively coupled to the first and/or second vehicle 106, to the vehicle system 102, or any combination therein. For example, the first external sensor system 130A may be a coolant temperature sensor. selectively coupled to the vehicle 106 at a location near the engine water inlet conduit in order to sense the coolant temperature during inspection of the vehicle cooling system. Alternatively, the first external sensor system 130A (e.g., the coolant temperature sensor) may be selectively disconnected from the vehicle 106 if the inspection event does not include inspection of the vehicle cooling system. For example, the external sensor systems 130 may be selectively disconnected from the vehicle 106 subsequent to the inspection event and/or the maintenance event. One or more external sensor systems 130 may be transferred off-board the vehicle 106 subsequent to the inspection event, and one or more external sensor systems 130 may remain disposed onboard the vehicle 106 subsequent to the inspection event.

The external sensor systems 130 are transferable between onboard and off-board the vehicle 106 and are operably coupled with the controller 104 in accordance with one embodiment. The first and second external sensor systems 130A, 130B may be transferred between off-board and onboard the vehicle 106, transferred between a first location and a second location onboard the vehicle 106, transferred between the first vehicle 106A and the second vehicle 106B, or the like.

The first external sensor system 130A may sense (e.g., monitor, gather, measure, collect, read, or the like) first sensor information (e.g., the engine oil inlet temperature) during a first operation of the vehicle 106, and the second external sensor system 130B may sense (e.g., monitor, gather, measure, collect, read, or the like) second sensor information (e.g., the engine water inlet temperature) during a second operation of the vehicle 106. For example, the first external sensor system 130A may be selectively coupled to the vehicle 106 at a first location (e.g., coupled to an engine oil inlet conduit in order to measure the temperature of the oil that is directed into the engine) during a first operation of the vehicle 106 (e.g., at an increasing speed of the vehicle), and the second external sensor 130B may be selectively coupled to the vehicle 106 at a second location (e.g., coupled to an engine water inlet conduit in order to measure the temperature of the coolant that is directed into the engine) during a second operation of the vehicle 106 (e.g., at a decreasing speed of the vehicle) during a vehicle inspection event.

Optionally, the first and second external sensor systems 130 may be disposed at a same location onboard the vehicle 106 in order to sense the first sensor information during the first operation of the vehicle with the first external sensor system 130A, and to sense the second sensor information during the second operation of the vehicle with the second external sensor system 130B. Optionally, the first external sensor system 130A may be selectively coupled to the vehicle, and the second external sensor system 130B may not be selectively coupled to vehicle.

In the illustrated embodiment, the first and second external sensor systems 130 are disposed onboard the first vehicle 106A. Optionally, the first external sensor system 130A may be disposed onboard the first vehicle 106A, and the second external sensor system 130B may be disposed onboard the second vehicle 106B. For example, in the distributed power arrangement, the first vehicle 106A may instruct the second vehicle 106B to change the brake setting. The second external sensor system 130B may sense the second sensor information (e.g., measure the air brake pressure of the second vehicle 106B propulsion subsystem) during operation of the vehicle system 102.

In one embodiment, the first external sensor system 130A determines an operating characteristic of the vehicle 106. For example, the first external sensor 130A may sense (e.g., measure, read, collect) sensor information that is indicative of how one or more components and/or one or more systems of the vehicle 106 are operating. In one example, the first external sensor system 130A may be a pressure sensor configured to measure the air pressure of the air brake system. The first external sensor system 130A may determine that an air compressor of the brake system is not operating to increase the pressure in the brake system within a designated time limit. In another example, the first external sensor system 130A, selectively coupled with the vehicle 106, may determine that a heat exchanger of the cooling system is reducing the temperature of the coolant to a designated temperature range. Optionally, the operating characteristic may be any alternative characteristic of the vehicle 106.

In one embodiment, the second external sensor system 130B determines an externality characteristic of the first external sensor system 130A that is representative of an external condition to which the first external sensor system 130A is exposed. The external condition may be an ambient temperature, ambient pressure, ambient humidity, or the like, of the environment to which the first external sensor system 130A is exposed. For example, the second external sensor system 130B may determine that the first external sensor system 130A is exposed to a temperature that is greater than a designated threshold temperature, such as when the first external sensor system 130A is sensing operating characteristics of a vehicle when the vehicle is located in Phoenix, Arizona compared to when the vehicle is located in Buffalo, New York Additionally or alternatively, the external condition to which the first external sensor system 130A is exposed may be a temperature, pressure, humidity, or the like, of the vehicle 106. For example, the first external sensor system 130A may be operably coupled to an exhaust conduit of the engine. The second external sensor system 130A may determine that the first external sensor system 130A is exposed to a temperature that is greater than a designated threshold temperature, such as when the first external sensor system 130A is operably coupled to an engine exhaust conduit compared to when the first external sensor system 130A is operably coupled to an engine coolant input conduit.

Additionally, the second external sensor system 130B determines an externality characteristic of the vehicle 106 that is representative of an external condition to which the vehicle 106 is exposed. For example, the second external sensor system 130B may determine that the vehicle is exposed to an air pressure that is lower than a designated threshold pressure, such as when the vehicle 106 is located in Denver, Colorado compared to when the vehicle 106 is located in New Orleans, Louisiana.

In one embodiment, the external sensor systems 130 verify the functionality of the control system sensors 230. For example, the external sensor systems 130 may validate the sensed information that is obtained, monitored, collected, measured, read, or the like, by the control system sensors 230. The external sensor systems 130 may sense information that is the same, or similar to the sensed information sensed by the control system sensors 230 in order to check that the control system sensors 230 are functioning correctly, in order to check if one or more of the control system sensors 230 are not functioning correctly, or the like.

Figure 2:
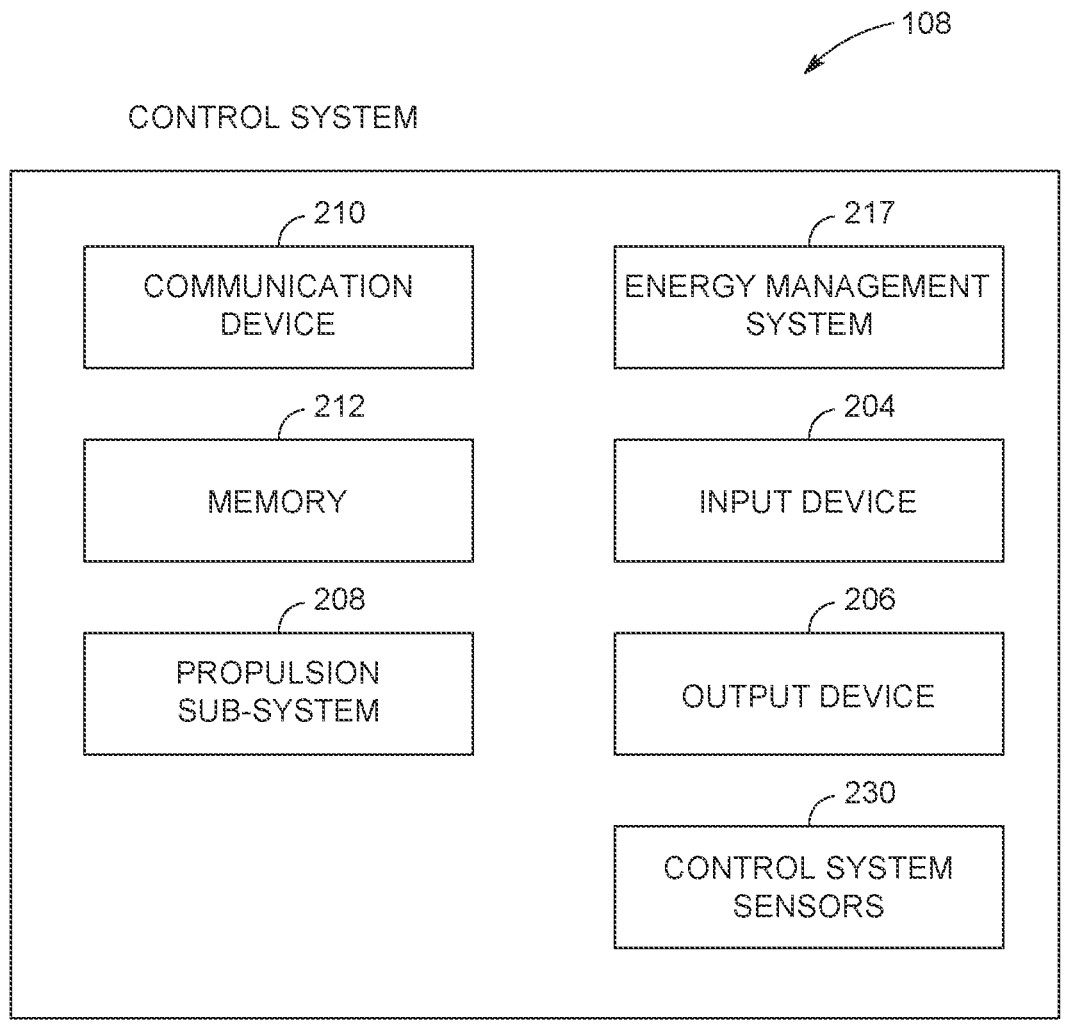
FIG. 2 illustrates a schematic illustration of an onboard control system for a propulsion-generating vehicle in accordance with one embodiment.

FIG. 2 is a schematic illustration of the control system 108 disposed onboard the vehicles 106 in accordance with one embodiment. The control system 108 controls operation of the vehicles 106. The control system 108 can include or represent one or more hardware circuits or circuitry that include, are connected with, or that both include and are connected with one or more processors, controllers, or other hardware logic-based devices that perform the operations described herein in connection with the control system 108. The control system 108 is connected with an input 204 and an output 206. The control system 108 can receive manual input from an operator of the vehicle 106 through the input 204, such as a touchscreen, keyboard, electronic mouse, microphone, throttle handle, switch, or the like. For example, the control system 108 can receive manually input changes to the tractive effort, braking effort, speed, power output, and the like, from the input 204. For example, the control system 108 may receive a single instance of an actuation of the input 204 to initiate the established communication link 112 between the vehicles 106A, 106B.

The control system 108 can present information to the operator of the vehicles 106 using the output 206, which can represent a display screen (e.g., touchscreen or other screen), speakers, printer, or the like. For example, the control system 108 can present the identities and statuses of the vehicles 106A, 106B, identities of missing vehicles (e.g., those vehicles from which the vehicle 106A has not yet received status information), contents of one or more command messages, or the like.

The control system 108 is connected with a propulsion subsystem 208 of the vehicle 106. The propulsion subsystem 208 provides tractive effort and/or braking effort of the propulsion-generating vehicles 106. The propulsion subsystem 208 may include or represent one or more engines, motors, alternators, generators, brakes, batteries, turbines and the like, that operate to propel the vehicles 106 under the manual or autonomous control that is implemented by the control system 108. For example, the control system 108 can generate control signals autonomously or based on manual input that is used to direct operations of the propulsion system 208.

The control system 108 is connected with a communication device 210 and a memory 212 in the vehicle 106. The memory 212 can represent an onboard device that electrically and/or magnetically stores data. For example, the memory 212 may represent a computer hard drive, random access memory, read-only memory, dynamic random access memory, an optical drive, or the like. The memory 212 stores status data of the vehicle 106 and/or the vehicle system 102 that is indicative of the state of the vehicle 106 and/or vehicle system 102 during transit of the vehicle 106 and/or vehicle system 102. For example, the memory 212 may store data obtained from previous operations of the propulsion subsystem 208 of the vehicle 106 and/or of the propulsion subsystem 208 of each vehicle of the vehicle system 102 (e.g., data from the most recent trip, the ten most recent trips, all past trips, or the like). Additionally or alternatively, the memory may store data obtained from previous operations of individual components of the propulsion subsystem 208, such as one or more of radiator shutter functionality, radiator cooling fan functionality, coolant flow rates, engine temperature measurements, engine water inlet temperatures, engine lube inlet temperatures, or the like.

The communication device 210 includes or represents hardware and/or software that is used to communicate with other vehicles in the vehicle system 102. For example, the communication device 210 may include a transceiver and associated circuitry (e.g., antenna 110 of FIG. 1) for wirelessly communicating (e.g., communicating and/or receiving) linking messages, command messages, reply messages, repeat messages, or the like. Optionally, the communication device 210 includes circuitry for communicating messages over a wired connection, such as an electric multiple unit (eMU) line of the vehicle system 102 (not shown), catenary or third rail of electrically powered vehicles, or another conductive pathway between or among the vehicles 106 of the vehicle system 102.

The control system 108 is connected with an energy management system 217. The energy management system 217 can include hardware circuits or circuitry that include and/or are connected with one or more processors that perform the operations described herein in connection with the energy management system 217. The energy management system 217 can create a trip plan for trips of the vehicles 106 and/or the vehicle system 102 that includes the vehicles 106. A trip plan may designate operational settings of the propulsion-generating vehicles 106 and/or the vehicle system 102 as a function of one or more of time, location, or distance along a route for a trip. Traveling according to the operational settings designated by the trip plan may reduce fuel consumed and/or emissions generated by the vehicles and/or the vehicle system 102 relative to the vehicles and/or vehicle system traveling according to other operational settings that are not designated by the trip plan. The identities of the vehicles in the vehicle system 102 may be known to the energy management system 217 so that the energy management system 217 can determine what operational settings to designate for a trip plan to achieve a goal of reducing fuel consumed and/or emissions generated by the vehicle system 102 during the trip.

The control system 108 includes the one or more control system sensors 230. The control system sensors 230 sense temperature, pressure, vibrations, fluid flow rates, gas flow rates, visually inspect via a camera, audio inspect via a microphone, or the like, of one or more components and/or systems of the vehicle 106. For example, the control system sensors 230 may be coolant temperature sensors, manifold absolute pressure sensors, air flow meters, or any alternative sensors. The control system sensors 230 are operably coupled with one or more components and/or systems of the vehicle 106 in order to sense information indicative of the components and/or systems during movement of the vehicle (e.g., during a trip). Additionally, the control system sensors 230 are operably coupled with the controller 104 during the inspection event and/or the maintenance event of the vehicle 106. For example, the controller 104 may obtain sensor information from the control system sensors 230 during an inspection event of the vehicle.

Figure 3:
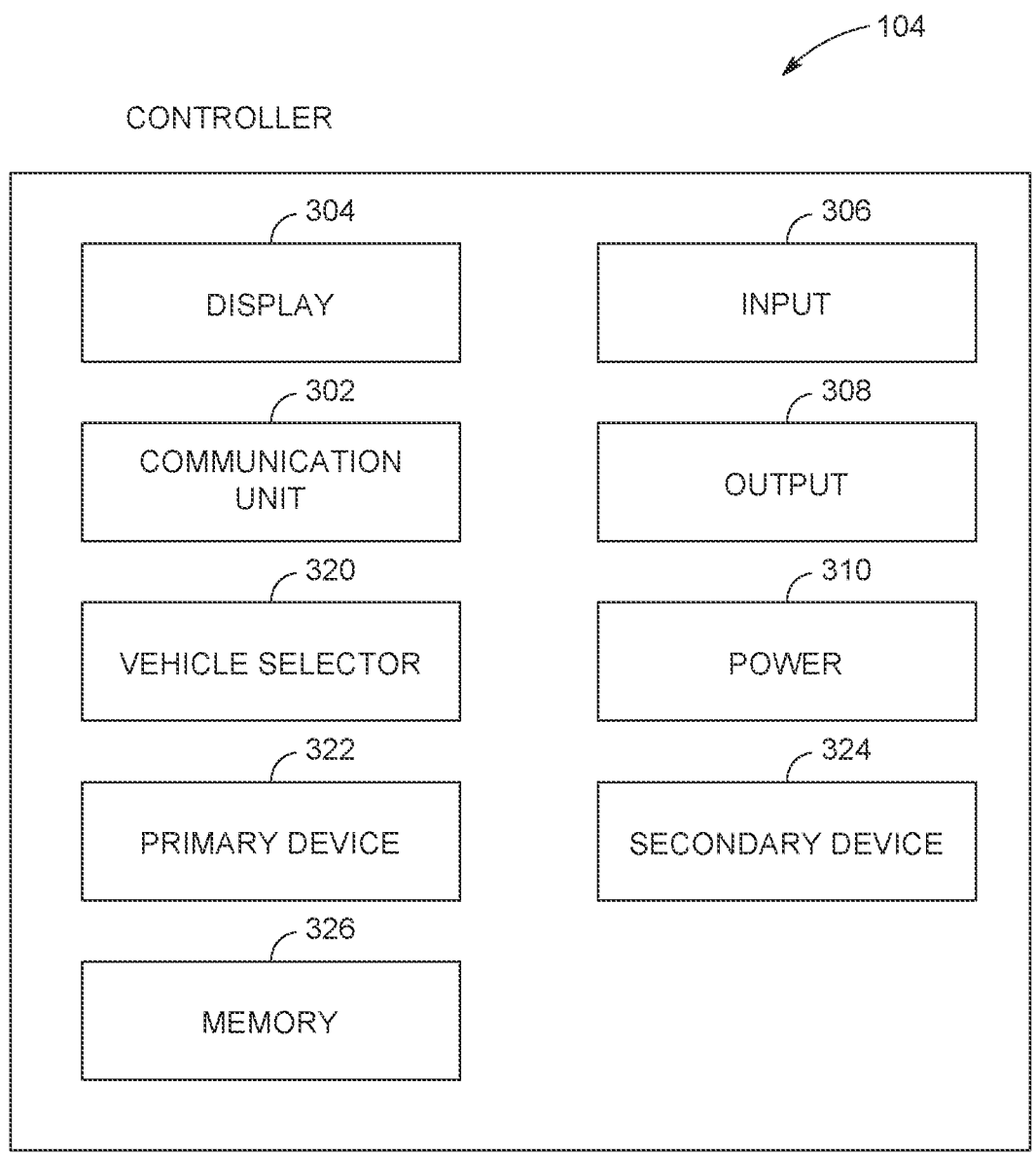
FIG. 3 illustrates a schematic illustration of a controller in accordance with one embodiment.

FIG. 3 illustrates a schematic illustration of the controller 104 in accordance with one embodiment. The controller 104 is transferable between off-board and onboard the vehicle 106. The controller 104 may be onboard and/or off-board the vehicle 106 and/or the vehicle system 102 and is operably coupled with the control system 108 of the vehicle 106. For example, the controller 104 may be wirelessly connected to the control system 108, mechanically coupled via an Ethernet cable, or the like. The controller 104 represents hardware circuitry that includes and/or is connected with one or more processors (e.g., microprocessors, controllers, field programmable gate arrays, integrated circuits, or the like) that perform the operations described herein in connection with the controller 104. The method of operation of the controller 104 will be discussed in more detail below with FIG. 6.

The controller 104 generates command signals that are communicated by a communication unit 302. The command signals control operations of the vehicle 106. For example, the command signals instruct the control system 108 to initiate one or more operations of the vehicle during inspection and/or maintenance of the vehicle 106. The communication unit 302 can send and/or receive communication signals with the vehicle 106 by a communication link 120 between the control system 108 and the controller 104. The controller 104 receives one or more of status data, sensor information, image data, or the like, that is stored by the memory 212 of the control system 108. For example, the controller 104 may receive status and/or sensor information that is indicative of the current state of the vehicle 106, that is indicative of the state of the vehicle 106 during a previous operation (e.g., a past trip), that is indicative of the state of components and/or systems of the vehicle 106 during an instructed operation of the vehicle 106, or the like.

In one or more embodiments, the controller 104 may control the communication device 210 of the control system 108 by activating the communication device 210. The control system 108 examines the messages that are received by the communication device 210. For example, the control system 108 of the vehicle 106 can examine received command messages to determine if the directives have been sent by the controller 104, sent from one or more additional vehicles of the vehicle system 102, or from any other system. The control system 108 implements the directive by creating control signals that are communicated to one or more systems of the vehicle 106 and/or one or more systems of the vehicle system 102 for autonomous control and/or implementation of the directive. For example, the braking system of the vehicle system 102 may need to be inspected. The controller 104 may communicate a directive that instructs the control system 108 of the first vehicle 106A to increase the throttle setting of the propulsion subsystem of the first vehicle 106, and subsequently communicate a second directive to the control system 108 instructing the system 102 to increase a brake setting of the system 102 in order for the braking system, and components associated with the braking system, to be inspected. Optionally, the controller 104 may communicate directives to the control system 108 to simulate operating conditions of the vehicle 106 in order to inspect, maintain, or determine a condition of any alternative system, any subsystem of a vehicle system 102, any components of the vehicle 106, or the like. Optionally, the controller 104 may communicate directives to the control system 108 of the first vehicle 106 to simulate operating conditions of the second vehicle 106B in the distributed power arrangement.

The controller 104 can include one or more input devices 306 and/or output devices 308 such as a keyboard, an electronic mouse, stylus, microphone, touch pad, or the like. The input and/or output devices 306, 308 are used to communicate command signals to the control system 108. Additionally or alternatively, the input and/or output devices 306, 308 may be used to communicate signals with an alternative vehicle system, a repair center, a dispatch center, or the like.

The controller 104 can include one or more displays 304 such as a touchscreen, display screen, electronic display, or the like. The displays may visually, graphically, statistically, or the like, display information to the operator of the controller 104. In one example, the displays 304 may provide instructions to one or more operators of the controller 104 and/or one or more operators of the vehicle 106 that instruct the operators how to inspect or maintain the vehicle 106. For example, the instructions may communicate to the operator a task to perform (e.g., measure the water pressure of the cooling system), when to perform the task (e.g., after the propulsion subsystem has reached a designated speed), how to perform the task (e.g., read measurements from the first external sensor system 130A), or the like, in order to determine a condition of the vehicle 106 (e.g., a condition of the cooling system, a condition of components of the cooling system, or the like). Additionally or alternatively, the controller 104 may autonomously and/or semi-autonomously (e.g., without operator input) determine a condition of a system of the vehicle (e.g., the condition of the cooling system of the vehicle), a condition of a component of the vehicle (e.g., a heat exchanger of the cooling system), or the like.

The controller 104 is operably connected with components and/or systems of the vehicle system 102. Additionally or alternatively, the controller 104 may be operably connected with components or alternative systems onboard and/or off-board the vehicle system 102. For example, the controller 104 may be wirelessly connected with a vehicle repair center in order to autonomously locate a spare part to replace a faulty component of the vehicle 106, create a work order to have the faulty component replaced, update a status of the vehicle 106 indicating to an operator of one or more systems that the vehicle 106 needs repair, or the like.

The controller 104 can include a power unit 310. The power unit 310 powers the controller 104. For example, the power unit may be a battery and/or circuitry that supplies electrical current to power other components of the controller 104. Additionally or alternatively, the power unit 310 may provide electrical power to one or more other systems.

The controller 104 includes a vehicle selector 320. The operator of the controller 104 can activate the vehicle selector 320 in order to select the vehicle of the vehicle system 102 from which the controller 104 would like to obtain sensor information from. For example, the controller 104 may be operably coupled with the control system 108 onboard the first vehicle 106A, however the operator of the controller 104 may want to obtain status data from the second vehicle 106B. The operator of the controller 104 may select the second vehicle 106B, or one or more additional vehicles of the vehicle system 102 using the vehicle selector 320. For example, the command signal communicated by the controller 104 may instruct the control system 108 onboard the first vehicle 106A to request status data from the memory 212 of the second vehicle 106B (e.g., via the communication link 112) in order to receive the status data of the second vehicle 106B at the control system 108 of the first vehicle 106A and communicate the received status data to the controller 104 (e.g., via the distributed power arrangement communication link 120).

The controller 104 is connected with a memory 326. The memory 326 can represent a device that electrically and/or magnetically stores data. For example, the memory 212 may represent a computer hard drive, random access memory, read-only memory, dynamic random access memory, an optical drive, or the like. The memory 326 stores status data indicative of the state of the vehicle or vehicle system that is obtained by the controller 104. For example, the memory 326 may store data indicating a determined condition of the vehicle, condition of one or more systems of the vehicle, condition or one or more components of the vehicle, or the like. For example, the memory 326 may store the sensor information related to a damaged component in order for an operator to better understand how, why, or when the component was damaged. Additionally or alternatively, the controller 104 may transfer data between the memory 326 and an alternative database outside of the controller 104. For example, the controller 104 may wirelessly transfer data via the communication unit 302 from the memory 326 to a server and/or database at a location away from the vehicle 106.

The controller 104 also includes a primary device 322 and a secondary device 324. The primary device 322 can include hardware circuits or circuitry and/or software that includes and/or are connected with one or more processors that perform the operations described herein in connection with the primary device 322. The primary device 322 can read the sensor information indicative of the state of the vehicle. For example, the primary device 322 may be a first data acquisition device and may receive the sensor information of the vehicle 106 from the memory 212 onboard the vehicle 106, where the sensor information is indicative of the state of the vehicle 106, the state of the systems of the vehicle 106, the state of components of the systems of the vehicle 106, or the like. The state of the vehicle may indicate how the vehicle is performing, the health of the vehicle, usage of components and/or systems of the vehicle, or the like. For example, the sensor information may indicate that a radiator shutter is malfunctioning, that the engine oil inlet temperature is outside of a designated threshold temperature, that the coolant fluid volume is outside of a designated threshold volume, or the like. The sensor information may be first sensor information that is obtained from the external senor systems 130, the control system sensors 230, or the like, during a first operation of the vehicle 106, wherein the first operation of the vehicle 106 is initiated by the controller 104 during the inspection event and/or maintenance event of the vehicle 106. Additionally or alternatively, the sensor information may be first sensor information that is obtained from the memory 212 that is stored from previous movement of the vehicle (e.g., a previous trip, previous inspection event, previous maintenance event, or the like). Optionally, the first sensor information may be stored in a cloud storage system or within an off-board dispatch system. For example, the first sensor information may have been obtained during previous movement of the vehicle, and the vehicle may have communicated the first sensor information with the cloud storage system, the off-board dispatch system, or the like.

As one example, the primary device 322 can request temperature measurements of a coolant in a cooling system to determine if a heat exchanger of the cooling system is reducing the temperature of the coolant or if the heat exchanger is not reducing the temperature of the coolant. As another example, the primary device 322 can request pressure measurements of an air brake system to determine whether an air compressor of the brake system is operating to increase the pressure in the brake system within an upper time limit. As another example, the primary device 322 can request pressure measurements of a pump within the cooling system of the vehicle to determine if the pressure of coolant that is going into and/or out of the pump is within a designated range.

If the sensor information from the vehicle 106 is incomplete, or if the controller 104 is unable to accurately, or within a predetermined threshold, determine the condition of the vehicle 106, the controller 104 may rely on the secondary device 324 in order to accurately, or within a certain threshold, determine the condition of the vehicle 106. For example, if the first sensor information does not allow the controller 104 to determine the condition of the vehicle (e.g., condition of the vehicle, systems, components, or the like), the controller 104 directs the control system 108 to change operations from a first operation to a different, second operation of the vehicle 106 by sending a command signal to the control system 108.

The secondary device 324 can include hardware circuits or circuitry and/or software that includes and/or are connected with one or more processors that perform the operations described herein in connection with the secondary device 324. The secondary device 324 can generate the command signals that are communicated to the control system 108 that direct the control system 108 to perform the one or more different, second operations of the vehicle 106. For example, the secondary device 324 may be a second data acquisition device and may generate a command signal that instructs the control system 108 how to initiate one or more operations without changing a configuration setup of the control system 108. The secondary device 324 generates the command signals that are communicated to the control system 108 in order for the controller 104 to receive the complete status data (e.g., in order to obtain the status data that is lacking) of the vehicle 106 to determine a condition of the components, systems, or the like of the vehicle 106 during the inspection event and/or maintenance event.

As one example, the memory 212, the control system sensors 230, or the control system 108 does not have the first sensor information indicative of temperature measurements of the coolant in the cooling system to determine if the heat exchanger of the cooling system is reducing the temperature of the coolant or if the heat exchanger is not reducing the temperature of the coolant. The secondary device 324 may direct the control system 108 of the vehicle 106 to initiate a second operation of the propulsion subsystem 208 (e.g., change a brake setting, or the like) as the propulsion subsystem 208 would normally operate during movement or during an operational state/phase other than an inspection state. For example, the secondary device 324 may direct the vehicle 106 to move around a railyard in order to check the status of the brakes, the engine, the distributed power arrangement, or the like. The secondary device 324 may direct the control system 108 to pump coolant through the cooling system in order to measure the temperature of the coolant. As another example, the control system 108 does not have pressure measurements of the air brake system to determine if the air brake system is operating to increase the pressure in the brake system. The secondary device 324 may instruct the control system 108 to apply the air brakes in order to obtain second sensor information from the external sensor systems 130 and/or the control system sensors 230 that is indicative of the time it takes for the air pressure within the air brake system to increase.

The secondary device 324 directs the control system 108 to perform an operation (e.g., a second operation) to obtain second sensor information when the control system 108 does not have the first sensor information. The different, second operation of the vehicle that the secondary device 324 instructs the control system 108 to perform is an operation that the vehicle 106 only performs during movement of the vehicle. For example, during a typical inspection event, individual systems and/or components may be inspected, and the individual systems and/or components may be forced into operation. For example, the air brakes may be engaged or disengaged, the cooling system may be pressurized or depressurized, electrical wiring may be tested, the radiator cap may be visually checked for defects, or the like. Alternatively, the controller 104 directs the control system 108 to initiate operations of the vehicle as the vehicle would operate during normal operation in order to obtain sensor information when the systems and components of the vehicle 106 work together. In one example, the electrical wiring may be tested by individually controlling electrical contacts in order to determine a power ground circuit.

The controller 104 instructs the vehicle 106 to perform operations without the vehicle 106 being aware that the vehicle 106 is being inspected and/or maintained. For example, the secondary device 324 may instruct the propulsion subsystem 208 to operate at a throttle setting (e.g., a speed that mimics a speed the vehicle would normally travel at during movement up an increasing terrain along a route), and subsequently direct the propulsion subsystem 208 to increase a brake setting (e.g., a brake setting that mimics a setting the vehicle would normally apply at a decreasing terrain along the route). By instructing the vehicle to perform operations that the vehicle would perform during normal operation of the vehicle, the controller 104 may obtain sensor information indicating the state of the vehicle when the vehicle systems and/or components function together. For example, information regarding the discharge of air from the air brakes as well as information around the air compressor operating conditions can be collected as sensor information indicative of a state of the braking system, the air compressor, the air conduits, or the like.

In the illustrated embodiment of FIG. 3, the primary device 322 and the secondary device 324 are shown as being connected with the controller 104. Optionally, one or more of the primary device 322 or the secondary device 324 may be transferably coupled with the controller 104. Additionally or alternatively, the controller 104 may include the primary device 322 and may not include the secondary device 324.

For example, the secondary device 324 may be coupled to the control system 108 of the vehicle and wirelessly communicate with the controller 104.

Additionally or alternatively, in one or more embodiments, the primary device 322 may be unable to obtain the requested status information if the control system 108 is not equipped with the correct control system sensors 230. For example, the vehicle 106 may not be equipped with a coolant temperature sensor, a manifold absolute pressure sensor, an air flow meter, or an alternative sensing device configured to indicate the state of the vehicle 106 and/or the state of one or more components and/or systems of the vehicle 106. One or more external sensor systems 130 may be selectively coupled with the vehicle 106 in order for the controller 104 to obtain sensor information from the external sensor systems 130 indicating the state of the vehicle 106, the state of components of the vehicle 106, the state of the systems of the vehicle 106, or the like.

Additionally or alternatively, in one or more embodiments, a maintenance tool (not shown) may be coupled with the controller 104 during a maintenance event for the vehicle 106, for a sensor of the vehicle 106, for the control system 108, or the like. For example, the maintenance tool may be a cleaning device, such as a pressure washer, that is coupled with the controller 104. The controller 104 may autonomously or semi-autonomously direct the cleaning device to operate when the vehicle 106 is stationary, until a cleaning process is complete, until the controller 104 confirms that the cleaning operation is complete, for a designated length of time, or the like. Optionally, the maintenance tool may be any alternative device that receives instructions from the controller 104 to perform an operation in accordance with the received instructions, for example, to assist with the vehicle inspection event.

Returning to FIG. 1, the controller 104 is configured to obtain sensor information of the vehicle 106 by sending command signals to the control system 108 onboard the vehicle 106. The command signals may be one or more of requests for sensor information, instructions for the control system 108 to initiate an operation by the vehicle 106, or the like. For example, the controller 104 is configured to control or stimulate movement of the vehicle 106 by instructing the control system 108 to initiate one or more operations of the vehicle, wherein the one or more operations are one or more operations performed by the control system 108 during movement of the vehicle 106 prior to and/or subsequent to an inspection event of the vehicle 106 by the controller 104. For example, the command signals may instruct the control system 108 to operate at a throttle setting that mimics a throttle setting of the vehicle 106 during a trip (e.g., before or after an inspection event).

The one or more processors of the controller 104 allows for inspection and/or maintenance of the vehicle 106 when the control system 108 lacks the sensor information indicative of the state of the vehicle 106. The secondary device 324 manipulates the vehicle 106 into performing an operation that results in the sought sensor information data being generated. For example, the secondary device 324 sends command signals to the control system 108 directing the vehicle 106 to perform one or more operations that simulates real-world operations of the vehicle system 102. The controller 104 obtains the sought sensor information that is generated to autonomously or semi-autonomously determine a condition of one or more components, one or more systems, or a combination therein, of the vehicle 106. For example, the controller 104 determines a condition of the vehicle indicative that may be an operational state, a fault state, a damaged state, or the like, of one or more components and/or systems of the vehicle 106.

Figure 4:
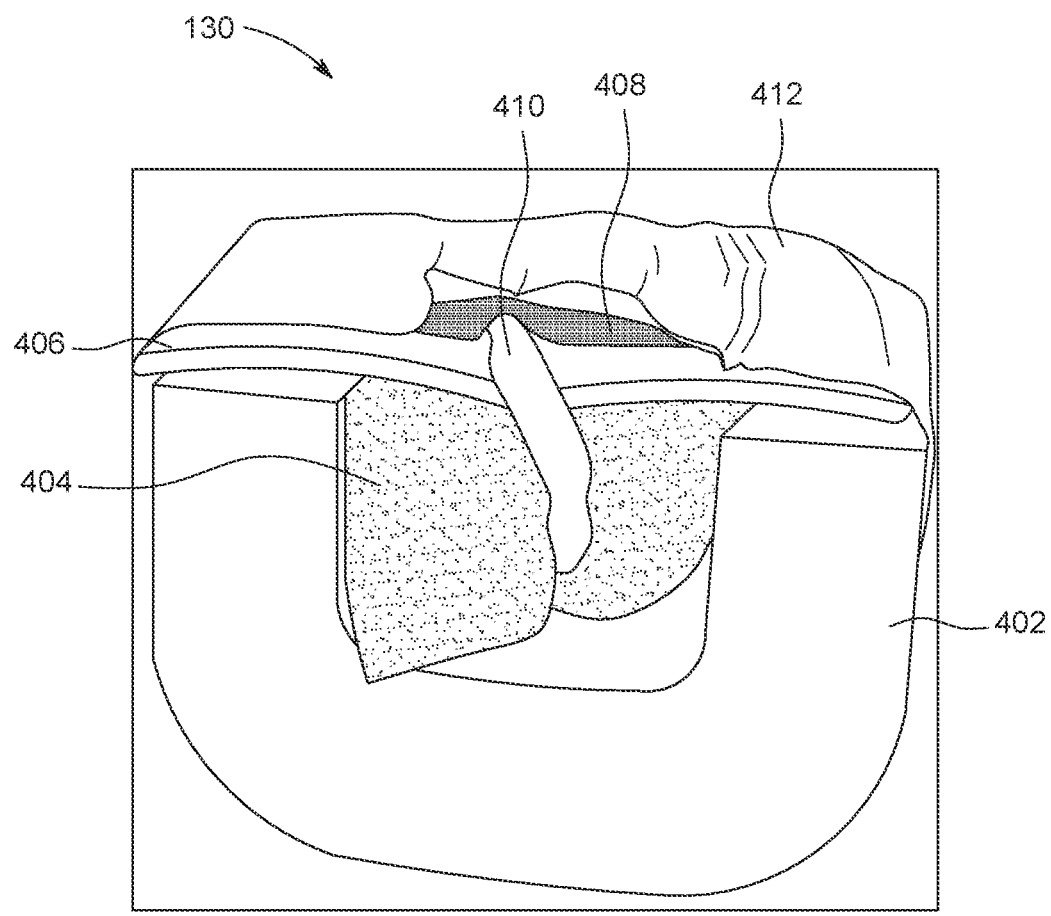
FIG. 4 illustrates a schematic illustration of a sensor system in accordance with one embodiment.
Figure 5:
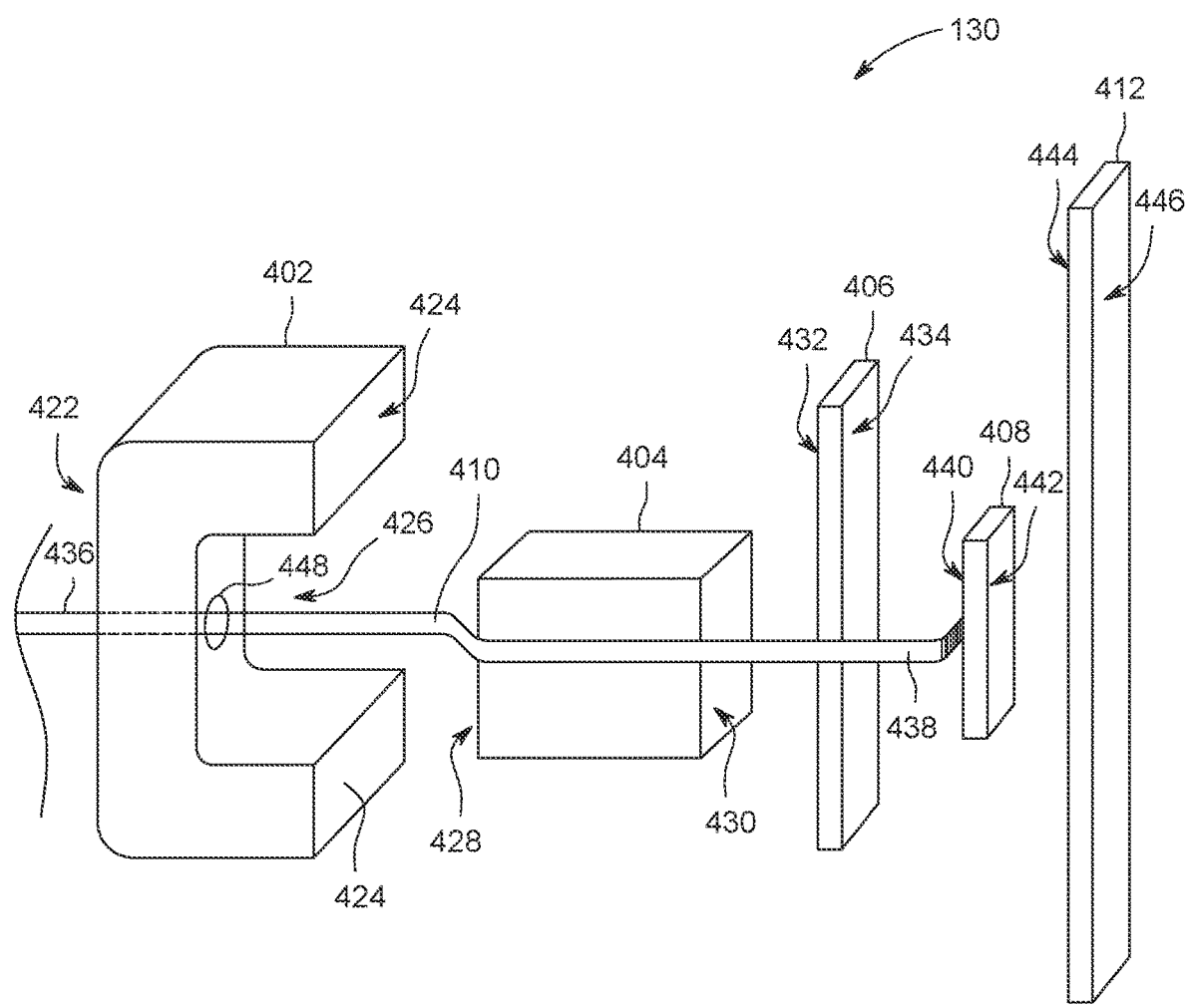
FIG. 5 illustrates an exploded illustration of the sensor system of FIG. 4 in accordance with one embodiment.

FIG. 4 illustrates a schematic illustration of one example of the external sensor system 130 of FIG. 1 in accordance with one embodiment. FIG. 5 illustrates an exploded illustration of the external sensor system 130 in accordance with one embodiment. FIGS. 4 and 5 will be discussed in detail together. In the illustrated embodiment, the external sensor system 130 is a sensor that is used to measure a temperature of one or more components, systems, or the like, of the vehicle 106. Additionally or alternatively, the external sensor system 130 may be any alternative sensor used to sense alternative information (e.g., pressures, flow rates, vibrations, visual information, audio information, or the like).

The external sensor system 130 may be used to read one or more surface temperatures of the vehicle 106 and/or a temperature inside of the surfaces of the vehicle 106. For example, the external sensor system 130 may be used to read the engine oil temperature, coolant temperature, or the like, of the vehicle 106. Optionally, the external sensor system 130 may be used to read the ambient temperature of the vehicle 106. Optionally, the external sensor system 130 may be used to read an alternative temperature. Additionally or alternatively, the external sensor system 130 may be an alternative sensor used to sense one or more characteristics of the vehicle 106, one or more characteristics of the environment of the vehicle 106, or any combination therein. For example, the external sensor system 130 may be used to determine an externality characteristic of the external sensor system 130 that may be indicative of one or more external conditions to which the external sensor system 130 is exposed. Additionally or alternatively, the externality characteristic may indicate one or more external conditions to which the vehicle 106 is exposed. The externality characteristics may include an ambient temperature, an ambient humidity, an ambient barometric pressure, or the like.

The external sensor system 130 has a magnet 402 that is used to maintain a position of the external sensor system 130 at a location of the vehicle 106. For example, the magnet may keep the external sensor system 130 pressed against a curved metal pipe, a flat metal surface, wall, or the like, of the vehicle 106. The magnet 402 has a first side 422, second sides 424, and a gap 426 between the second sides 424. In the illustrated embodiment, the magnetic 402 is generally C-shaped. Alternatively, the magnet 402 may have any alternative shape and/or size. Additionally or alternatively, the external sensor system 130 may use an alternative method and/or material to maintain a position at a location. For example, the sensor system 130 may be adhered to a surface with an adhesive material.

The external sensor system 130 has a first support layer 404 and a second support layer 406. The first support layer 404 is sized and/or shaped in order to be positioned inside of the gap 426 of the magnet 402 when the external sensor system 130 is assembled. For example, the first support layer 404 may be manufactured of a flexible or rigid material such as foam, or the like. A first side 428 of the first support layer 404 is received into the gap 426 of the magnet 402. The first support layer 404 is essentially cubed in shape and is sized and/or shaped in order to substantially fill the gap 426. Alternatively, the first support layer 404 may have any alternative shape and/or size. Optionally, the external sensor system 130 may be devoid of the first support layer 404. For example, the magnet 402 may have an alternative shape that is devoid the gap 426, and the system 130 may be devoid the first support layer 404 that substantially fills the gap 426.

The second support layer 406 is sized and/or shaped in order to be positioned on the second sides 424 of the magnet 402. The second support layer 406 has a rectangular cross-sectional shape and is manufactured of a flexible material, a rigid material, or any alternative material. For example, in the illustrated embodiment, the second support layer 406 is a strengthened foam material, such as Styrofoam, having a first side 432 and a second side 434. The first side 432 that is operably coupled to a second side 430 of the first support layer 404 and operably coupled to the second sides 424 of the magnet 402. For example, the first side 432 of the second support layer 406 may be pressed up against the second side 430 of the first support layer 404. The first support layer 404 provides support for the second support layer 406 at the gap 426 when the external sensor system 130 is assembled. For example, the first support layer 404 may prevent the second support layer 406 from curving, bending, or the like, into the gap 426 when the external sensor system 130 is assembled, when the sensor system 130 is mounted to a surface of the vehicle 106, or the like. The first support layer 404 enables the second support layer 406 to remain positioned essentially flat between the second sides 424 of the magnet 402.

The system 130 includes a temperature sensor 410 that reads the temperature of the surface that the system 130 is operably coupled to. For example, the temperature sensor 410 may be a thermistor, a resistance temperature detector, a heat flux sensor, a temperature gauge, a thermocouple, or the like. A first end 438 of the temperature sensor 410 is disposed between a thermal conductive layer 408 and the second support layer 406. The thermal conductive layer 408 transfers heat from the surface that the external sensor system 130 is operably coupled with to the sensor 410, and the second support layer 406 isolates (e.g., thermally, physically, or the like) the first end 438 of the sensor 410 from the magnet 402, convection to ambient air, or the like. A second end 436 of the temperature sensor 410 extends a distance away from the thermal conductive layer 408 and through a passage 448 of the magnet 402. For example, the second end 436 extends a distance away from the system 130 in order to be operably coupled to the control system 108, the controller 104, an alternative sensor reader, or the like.

The thermal conductive layer 408 that has a first side 440 that is coupled to the second side 434 of the second support layer 406 when the sensor system 130 is assembled. For example, the thermal conductive layer 408 may be a thermal pad that transfers heat from the surface that the external sensor system 130 is operably coupled with to pass through the thermal conductive layer 408 to the first end 438 of the sensor 410.

The first support layer 404, the second support layer 406, the thermal conductive layer 408 and the temperature sensor 410 may be held in an assembled position with the magnet 402 with one or more conductive adhesive layers 412. For example, the conductive adhesive layer 412 may be one or more pieces of a conductive tape with an adhesive side 444 and a non-adhesive side 446. The adhesive side 444 of the conductive adhesive layer 412 is adhered to the magnet 402 in order to assemble the external sensor system 130. The conductive adhesive layer 412 may enable heat to be transferred from the surface to which the external sensor system 130 is coupled to, to the temperature sensor 410.

Figure 6:
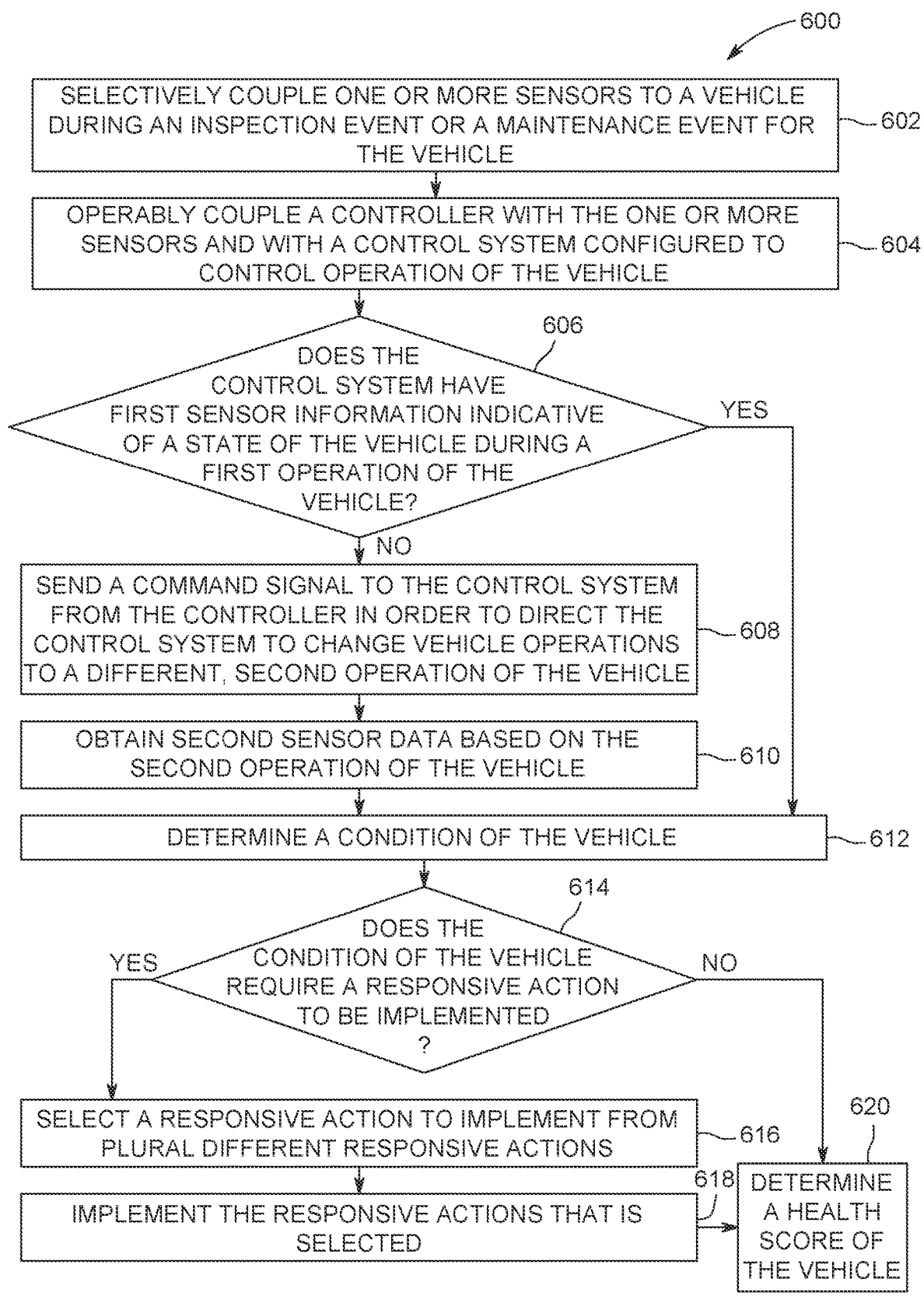
FIG. 6 illustrates a flowchart of a method for determining a fault state of a vehicle in accordance with one embodiment.

FIG. 6 illustrates a flowchart of a method 600 for inspecting and/or maintaining a vehicle with the inspection system 100 in accordance with one embodiment. At 602, one or more sensors are selectively coupled to a vehicle during an inspection event and/or a maintenance for a vehicle 106. For example, one or more external sensor systems 130 may be transferably coupled to the vehicle 106 to inspect the vehicle 106. At 604, the controller 104 is operably coupled with the control system 108 that controls operations of the vehicle 106, and is operably coupled with the one or more sensors. The controller 104 is operably coupled with the control system 108 in order to cause the control system 108 to initiate one or more operations of the vehicle 106 during the inspection event and/or maintenance event. Additionally, the controller 104 is operably coupled the control system sensors 230 and the one or more external sensor systems 130 in order to obtain sensor information indicative of a state of the vehicle 106.

At 606, a decision is made by the controller 104 to determine if the control system 108 has first sensor information indicative of a state of the vehicle during a first operation of the vehicle 106. For example, the vehicle 106 may have over-heated and the vehicle 106 is transferred to a repair center. The controller 104 may request first sensor information from the memory 212 of the control system 108, from the control system sensors 230, from the external sensor systems 130, or any combination of one or more of therein, that is indicative of the state of the vehicle 106, for example, when the vehicle 106 overheated. For example, the controller 104 may request sensor information of the first operation of the vehicle 106. The first operation of the vehicle 106 may be to bring engine speed of the vehicle 106 to a first throttle setting in order to gather information that includes radiator shutter functionality, radiator cooling fan functionality, coolant flow rates, engine oil temperature measurements, engine coolant temperature measurements, engine lube temperature measurements, or the like, during the first operation of the vehicle 106. The first sensor information may be in the form of numerical data, graphical data, statistical data, pass/fail indicator, or the like. Optionally, the first sensor information may include current and/or stored operational data associated with the vehicle system 102. For example, the first sensor information may include operational data and/or maintenance data of the radiator shutter stored in the memory 212. If the controller 104 determines that the control system 108 does have the first sensor information indicative of the state of the vehicle 106, then flow of the method proceeds towards 612. Alternatively, if the controller 104 determines that the control system 108 does not have the first sensor information indicative of the state of the vehicle 106, then flow of the method proceeds towards 608.

Additionally or alternatively, in one or more embodiments the controller 104 may determine if the control system 108 of the first and second vehicles 106A, 160B have the first sensor data. For example, the controller 104 may be operably coupled with the control system 108 of the first vehicle 106A, and may request sensor information from both the first and second vehicles 106A, 106B in order to determine a condition of one or more of the first or second vehicles 106A, 106B and/or of the vehicle system 102. The control system 108 of the first vehicle 106A may operate using the distributed power configuration of the vehicle system 102 (of FIG. 1) to communicate the request signal to the second vehicle 106B via the communication link 112.

At 608, the controller 104 sends a command signal to the control system 108 from the controller 104 in order to direct the control system 108 to change vehicle operations from the first operation to a different, second operation. For example, the first sensor information that is sensed during the first operation of the vehicle 106 may not indicate the condition of the vehicle 106. The secondary device 324 of the controller 104 may send a command signal to the control system 108 instructing the control system 108 to operate at a second operation. For example, the second operation may be to bring the engine speed of the vehicle 106 to a second throttle setting that is greater than the first throttle setting, in order to gather second sensor information that includes radiator shutter functionality, radiator cooling fan functionality, coolant flow rates, engine oil temperature measurements, engine coolant temperature measurements, engine lube temperature measurements, or the like, during the second operation of the vehicle 106. For example, the controller 104 may instruct the control system 108 to change one or more operations of components or systems of the vehicle 106 that force the components or systems to change, relative to waiting for the components or systems to change independently. The controller 104 may instruct the control system 108 to initiate one or more operations that are performed by the control system 108 during movement of the vehicle 106. For example, the command signals from the controller 104 may instruct the control system 108 to operate as it would operate (e.g. normal and/or typical throttle settings, brake settings, speed settings, radiator fan speeds, pump speeds, coolant flow rates, or the like) prior to and/or subsequent to the controller 104 determining a condition of the vehicle. For example, the control system 108 may instruct the propulsion subsystem 208 to operate at full power, to operate at varying intervals of increasing and/or decreasing power, to operate at full power then increase the brake setting (e.g., settings that mimic normal or typical operations of the vehicle traveling along the route).

Additionally, by instructing the control system 108 to perform one or more operations with the vehicle 106 that are normal and/or typical operations of the vehicle 106, the controller 104 does not change a configuration setup of the control system 108. For example, the controller 104 may instruct the control system 108 to initiate an operation such that the performed operation does not require the control system 108 to change a configuration or setup between the control system 108 and the propulsion subsystem 208, the energy management system 217, or any other system.

Additionally or alternatively, the controller 104 may not be able to instruct the control system 108 to perform one or more operations. For example, the vehicle 106 may be an old vehicle model with a control system 108 that is not compatible with and/or cannot receive all command signals from the controller 104. An operator of the vehicle 106 and/or the controller 104 may instruct the vehicle 106 to perform one or more operations with the vehicle 106 in order for the controller 104 to obtain the sensor information of the vehicle 106.

Additionally or alternatively, in one or more embodiments, the controller 104 may send a command signal to the control system 108 of the first vehicle 106A instructing the control system 108 of the second vehicle 106B to perform one or more operations. For example, the control system 108 of the first vehicle 106A may utilize the distributed power configuration of the vehicle system 102 (of FIG. 1) to communicate the command signal to the second vehicle 106B via the communication link 112 in order for the controller 104 to determine a condition of the second vehicle 106B.

At 610, the controller 104 obtains the second sensor information based on the second operation of the vehicle 106. For example, the controller 104 may obtain the second sensor information from one or more of the external sensor system 130, the control system sensors 230, or the memory 212. The control system 108 communicates the second sensor information based on the performed second operations of the vehicle 106 to the controller 104 (e.g., via the communication link 120).

At 612, the controller 104 determines a condition of the vehicle 106, a condition of one or more components of the vehicle 106, or a condition of one or more systems of the vehicle, based on the first and second sensor information that is indicative of an operational state, a fault state, a damaged state, of the components and/or systems of the vehicle. The fault state may be indicative of one or more of a faulty system of a faulty component; the damaged state may be indicative of a level of damage to a system or a component; the operational state may be indicative of the functionality of a system or a component. For example, the controller 104 may determine that the radiator shutters do not actuate when the engine speed exceeds a determined limit; may determine that the air compressor of the brake system fails to increase the pressure of in the brake system within a minimum time limit; may determine that the heat exchanger does not reduce the temperature of the coolant in the cooling system to a designated temperature; may determine that the radiator cooling fan operates only when the temperature of the cooling system is below a determined temperature; may determine that the water tank of the cooling system leaks water; may determine that the oil pressure drop across a lube oil cooler and filter exceeds a designated pressure threshold; or the like.

In one embodiment, the controller 104 determines a condition and diagnoses an operational state of the vehicle 106 based on one or more of the operating characteristic of the vehicle determined by a first sensor, on the externality characteristic of the first sensor determined by a second sensor, or on the externality characteristic of the vehicle 106 determined by the second sensor. For example, the control system sensors 230 may have the sensor information indicative of the operating characteristic of the vehicle 106. The control system sensors 230 (e.g., a cooling system temperature sensor) may determine that the heat exchanger is not reducing the temperature of the coolant in the cooling system of the vehicle 106. The external sensor systems 130 may determine one or more externality characteristics representative of one or more external conditions to which the control system sensors 230 are exposed. For example, the external sensor systems 130 may determine that the control system sensors 230 are disposed at a location onboard the vehicle 106 that is hotter relative to alternative locations onboard the vehicle 106. For example, the external sensor systems 130 may determine that the control system sensors 230 are disposed near the engine exhaust conduit which may have a higher temperature than the engine coolant inlet conduit. Additionally or alternatively, the external sensor system 130 may determine one or more externality characteristics representative of one or more external conditions to which the vehicle 106 is exposed. For example, the external sensor systems 130 may determine that the vehicle 106 is being inspected and/or maintained at a first repair center that has a higher humidity relative to a different, second repair center. For example, the vehicle 106 may be inspected at a location in Florida that has a greater ambient humidity level than a repair center located in Colorado. The externality conditions of the vehicle and the sensors may impact the operational characteristic of the vehicle 106. For example, an operating vehicle 106 exposed to a higher ambient temperature may overheat more quickly relative to an operating vehicle 106 exposed to a lower ambient temperature; a vehicle exposed to a higher ambient humidity may cause the electric wiring to short more easily relative to a vehicle exposed to a lower ambient humidity. Optionally, the first external sensor system 130A may determine the externality characteristics of the control system sensors 230 and/or the vehicle 106 when the vehicle 106 is operating at a first geographical location, and alternatively the second external sensor system 130B may determine the externality characteristics of the control system sensors 230 and/or the vehicle 106 when the vehicle 106 is operating at a second geographical location.

At 614, a decision is made if the determined condition of the vehicle 106 requires a responsive action to be implemented. For example, the controller 104 may determine whether or not a responsive action should be implemented in response to determining that the radiator shutter is failing to actuate, in response to the radiator cooling fan operating only when the temperature of the cooling system is below a determined temperature, in response to determining that the water tank of the cooling system has a leak, or the like. In one embodiment, the controller may recommend a responsive action, and may communicate the recommended responsive action with an operator of the vehicle. In another embodiment, the controller may select and/or identify a responsive action that is required. If a responsive action is required, then flow of the method proceeds towards 616. If a responsive action is not required (e.g., a component and/or system does not need to be repaired, replaced, inspected further, or the like), then flow of the method proceeds towards 620.

At 616, a responsive action from plural different response actions is selected to be implemented. For example, if the controller 104 has determined a condition of the components and/or systems of the vehicle 106 based on the first and second sensor information, then a responsive action may be selected in order to repair, correct, fix, improve the fault state, improve the state of health, or the like, of one or more components the vehicle 106. The plural different responsive actions may include one or more of scheduling routine maintenance of the vehicle, scheduling non-routine maintenance (e.g., immediate) of the vehicle, not taking any responsive action, repair or replace a damaged or worn component of the vehicle, repair or replace a damaged system of the vehicle, generate a work order for maintenance in order to repair or replace the component and/or system, notify the operator of the vehicle system 102 that the controller 104 has identified a condition of the system or component that requires a responsive action, update a status of the vehicle 106 indicating to one or more operators or other vehicles the condition of the vehicle 106, store the first and second sensor information in the memory 326 of the controller 104, store the determined faulty state (e.g., the faulty component, faulty system, or the like) in the memory 326 of the controller 104, schedule a cleaning operation in order to clean a component, the vehicle 106 and/or vehicle system using the cleaning device, or the like. Additionally or alternatively, the selected responsive action may be any alternative responsive action.

At 618, the responsive action that is selected from the plural different responsive actions is implemented. For example, if the controller 104 has determined that the vehicle 106 has a damaged radiator shutter, then the controller 104 may autonomously and/or semi-autonomously generate a work order identifying the damaged radiator shutter and schedule non-routine maintenance (e.g., immediate) of the vehicle 106 in order to replace the damaged radiator shutter. Additionally or alternatively, if the controller 104 has determined that the vehicle 106 has a measured volume of coolant that is below a designated threshold (e.g., the engine is overheating), then the controller 104 may autonomously or semi-autonomously generate a work order with instructions to add coolant to the cooling system of the vehicle 106.

At 620, the controller 104 determines a health score of the vehicle 106 based on the determined condition of the vehicle, the components, or the systems of the vehicle. For example, the controller 104 may determine that the vehicle 106 has a low health score (e.g., the vehicle is in poor health) if the difference between the first and second sensor information and predetermined target values of sensor information is high (e.g., above or greater than a designated threshold). For example, the sensor information may indicate that the volume of coolant flowing through the cooling system is low, however the measured volume of coolant flowing through the cooling system is a value greater than a predetermined target volume of coolant (e.g., not a fault state). Then the controller 104 may indicate that the health score of the cooling system of the vehicle 106 is low. Alternatively, if the measured volume of coolant flowing through the cooling system is high (e.g., is a measured value generally close to the predetermined target volume value), then the controller 104 may indicate that the health score of the cooling system of the vehicle 106 is high (e.g., the vehicle is in good health). In another example, the controller 104 has determined that a radiator shutter is damaged. The controller 104 may indicate that the health score of the cooling system of the vehicle 106 is low (e.g., the vehicle is in poor health) in response to the determined damaged radiator shutter.

In one or more embodiments, the controller 104 is coupled with the first vehicle 106A in order to diagnose a state of health of the first vehicle 106A. The controller 104 may be subsequently transferred off-board the first vehicle 106A and onboard the second vehicle 106B and coupled with the control system 108 that is onboard the second vehicle 106B in order to determine a condition of the second vehicle 106B. For example, the controller 104, when onboard the first vehicle 106A, may instruct the control system 108 of the first vehicle 106A to perform a first set of operations, and may autonomously diagnose a first condition (e.g., a malfunctioning radiator shutter) of the first vehicle 106A. The controller 104, when onboard the second vehicle 106B, may instruct the control system 108 of the second vehicle 106B to perform a second set of operations, wherein the second set of operations may be unique or the same as the first set of operations instructed to the first vehicle 106A. Additionally, the controller 104 may autonomously diagnose a second condition (e.g., engine coolant volumes are too low, or are below a designated threshold) of the second vehicle 106B. Alternatively, the second condition may be the same as the first condition of the first vehicle.

In one embodiment, the control system and/or the controller may have a local data collection system deployed that may use machine learning to enable derivation-based learning outcomes. The control system may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system and/or controller may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the control system may use evolution strategies techniques to tune various parameters of the artificial neural network. The control system may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle control system executes that plan to achieve the desired input data to mirror the predicted best outcome scenario. Additionally, the success metric may be a combination of the optimized outcomes, which may be weighed relative to each other.

The control system and/or the controller may use this artificial intelligence or machine learning to receive input (e.g., a location or change in location), use a model that associates locations with different operating modes to select an operating mode of the one or more functional devices of the HOV unit and/or EOV unit, and then provide an output (e.g., the operating mode selected using the model). The control system may receive additional input of the change in operating mode that was selected, such as analysis of noise or interference in communication signals (or a lack thereof), operator input, or the like, that indicates whether the machine-selected operating mode provided a desirable outcome or not. Based on this additional input, the control system can change the model, such as by changing which operating mode would be selected when a similar or identical location or change in location is received the next time or iteration. The control system can then use the changed or updated model again to select an operating mode, receive feedback on the selected operating mode, change or update the model again, etc., in additional iterations to repeatedly improve or change the model using artificial intelligence or machine learning.

In one embodiment of the subject matter described herein, an inspection system includes one or more sensors that are selectively coupled to a vehicle during one or more of an inspection event or a maintenance event for the vehicle and a controller that is operable to cause a control system of the vehicle that controls plural operations of the vehicle to initiate a first operation and a different, second operation of the plural operations of the vehicle. The controller is configured to determine whether the control system of the vehicle has first sensor information indicative of a state of the vehicle during the first operation of the vehicle. The controller is configured to send a command signal to the control system of the vehicle in order to direct the control system of the vehicle to change vehicle operations from the first operation to the second operation of the vehicle responsive to determining that the control system lacks the first sensor information that was requested. The controller obtains second sensor information from the one or more sensors based on the second operation of the vehicle and determines a condition of one or more components of the vehicle based on the first sensor information and the second sensor information.

Optionally, the first and second operations of the vehicle that are directed by the controller are operations performed by the control system during movement of the vehicle.

Optionally, the condition is indicative of one or more of an operational state, a fault state, or a damaged state of the one or more of the components of the vehicle.

Optionally, the controller is configured to determine a health score of the vehicle based on the condition of the one or more of the components of the vehicle.

Optionally, the controller is configured to one or more of autonomously or semi-autonomously determine the condition of the one or more components of the vehicle.

Optionally, the controller is configured to control movement of the vehicle with the control system during the one or more of the inspection event or the maintenance event for the vehicle.

Optionally, the controller is configured to select a responsive action to implement from plural different responsive actions based on the condition of the one or more of the components of the vehicle.

Optionally, a first sensor of the one or more sensors is configured to determine an operating characteristic of the vehicle, and a second sensor of the one or more sensors is configured to determine an externality characteristic of the first sensor, wherein the externality characteristic is representative of one or more external conditions to which the first sensor is exposed.

Optionally, the controller is configured to diagnose an operational state of the vehicle based on the operating characteristic of the vehicle and based on the externality characteristic of the first sensor.

In one embodiment of the subject matter described herein, a method includes selectively coupling one or more sensors of an inspection system to a vehicle during one or more of an inspection event or a maintenance event for the vehicle. The method includes operably coupling a controller with the one or more sensors of the inspection system wherein the controller is operable to cause a control system of the vehicle to initiate a first operation of the vehicle and a different, second operation of the vehicle. During the first operation of the vehicle it is determined whether the control system of the vehicle has first sensor information indicative of a state of the vehicle. Responsive to determining that the control system lacks the first sensor information, the controller sends a command signal to the control system of the vehicle in order to direct the control system of the vehicle to change vehicle operations from the first operation to the second operation of the vehicle by sending a command signal to the control system of the vehicle. Second sensor information is obtained from the one or more sensors based on the second operations of the vehicle. A condition of one or more components of the vehicle is determined based on the first sensor information and the second sensor information.

Optionally, the first and second operations of the vehicle that are directed by the controller are operations performed by the control system during movement of the vehicle.

Optionally, the method also includes determining a health score of the vehicle based on the condition of the one or more of the components of the vehicle.

Optionally, determining the condition of the vehicle is carried out by the controller one or more of autonomously or semi-autonomously.

Optionally, the method also includes selecting a responsive action to implement from plural different responsive actions based on the condition of the one or more of the components of the vehicle.

Optionally, the method also includes determining, with a first sensor of the one or more sensors, an operating characteristic of the vehicle, and determining with a second sensor of the one or more sensors, an externality characteristic of the first sensor, wherein the externality characteristic is representative of one or more external conditions to which the first sensor is exposed.

Optionally, the method also includes diagnosing an operational state of the vehicle based on the operating characteristic of the vehicle and based on the externality characteristic of the first sensor.

In one embodiment of the subject matter described herein, a system includes a first sensor configured to determine an operating characteristic of a vehicle and a second sensor configured to determine one or more of an externality characteristic of the first sensor or an externality characteristic of the vehicle. The externality characteristic of the first sensor is representative of one or more external conditions to which the first sensor is exposed. The externality characteristic of the vehicle is representative of one or more external conditions to which the vehicle is exposed. The system includes a controller configured to diagnose an operational state of the vehicle based on the operating characteristic of the vehicle and based on the one or more of the externality characteristic of the first sensor or the externality characteristic of the vehicle Optionally, the controller is operable to cause a control system of the vehicle that controls operations of the vehicle to initiate one or more of the operations of the vehicle. The controller is configured to obtain one or more of the operating characteristics or the externality characteristics responsive to initiating the one or more operations of the vehicle in order to diagnose the operational state of the vehicle.

Optionally, the controller is configured to determine a health score of the vehicle based on the operational state of the vehicle.

Optionally, the controller is configured to one or more of autonomously or semi-autonomously diagnose the operational state of the vehicle.

Optionally, the controller is configured to select a responsive action to implement from plural different responsive actions based on the operational state of the vehicle.

In one embodiment of the subject matter described herein, a method includes requesting status data of a control system that controls operation of a vehicle from an inspection system that is off-board the vehicle during movement of the vehicle. The method includes determining whether the control system of the vehicle has the status data indicative of a state of the vehicle. Responsive to determining that the control system lacks the status data that was requested, the method includes directing the control system of the vehicle to perform one or more operations with the vehicle by sending a command signal to the control system of the vehicle from the inspection system without changing a configuration setup of the control system, obtaining the status data that was requested based on the performance of the one or more operations by the vehicle, and determining a fault state of the vehicle based on the one or more operations at the inspection system.

Optionally, the one or more operations of the vehicle that are directed by the inspection system are one or more operations performed by the control system during movement of the vehicle one or more of prior to or subsequent to inspection of the vehicle by the inspection system.

Optionally, the fault state is indicative of one or more of a faulty system or a faulty component.

Optionally, the method further includes diagnosing the fault state as one or more of a faulty system or a faulty component of the vehicle, wherein diagnosing the one or more of the faulty system or the faulty component includes selecting a responsive action to implement from plural different responsive actions.

Optionally, the method further includes implementing the responsive action that is selected from the plural different responsive actions.

Optionally, the method further includes determining a health score of the vehicle based on one or more of the state of the vehicle of the fault state of the vehicle from the inspection system.

Optionally, the method further includes controlling movement of the vehicle with the control system while the inspection system is onboard the vehicle.

In another embodiment of the subject matter described herein, a system includes an inspection system that is off-board a vehicle during movement of the vehicle. The inspection system includes one or more processors configured to request status data of a control system that controls operations of the vehicle. The one or more processors are configured to determine whether the control system of the vehicle has the status data indicative of a state of the vehicle, direct the control system of the vehicle to perform one or more operations with the vehicle by sending a command signal to the control system of the vehicle without changing a configuration setup of the control system responsive to determining that the control system lacks the status data that was requested, obtain the status data that was requested based on the performance of the one or more operations by the vehicle, and determine a fault state of the vehicle based on the one or more operations at the inspection system.

Optionally, the one or more operations of the vehicle that are directed by the inspection system are one or more operations performed by the control system during movement of the vehicle one or more of prior to or subsequent to inspection of the vehicle by the inspection system.

Optionally, the fault state is indicative of one or more of a faulty system or a faulty component.

Optionally, the one or more processors are configured to diagnose the fault state as one or more of a faulty system or a faulty component of the vehicle, wherein diagnosing the one or more of the faulty system or the faulty component includes selecting a responsive action to implement from plural different responsive actions.

Optionally, the one or more processors are configured to implement the responsive action that is selected from the plural different responsive actions.

Optionally, the one or more processors are configured to determine a health score of the vehicle based on one or more of the state of the vehicle or the fault state of the vehicle.

Optionally, the one or more processors are configured to control movement of the vehicle with the control system while the inspection system is onboard the vehicle.

Optionally, the one or more processors are configured to autonomously determine the fault state of the vehicle.

Optionally, the inspection system further includes a primary device and a secondary device, wherein the primary device determines the state of the vehicle and the secondary device determines the fault state of the vehicle.

In another embodiment of the subject matter described herein, a system includes an inspection system that is off-board a vehicle during movement of the vehicle. The inspection system includes one or more processors configured to request status data of a control system that controls operations of the vehicle. The one or more processors are configured to determine whether the control system of the vehicle has the status data indicative of a state of the vehicle. The one or more processors are configured to direct the control system of the vehicle to perform one or more operations with the vehicle by sending a command signal to the control system of the vehicle without changing a configuration setup of the control system responsive to determining that the control system lacks the status data that was requested. The one or more processors are configured to obtain the status data that was requested based on the performance of the one or more operations by the vehicle, determine a fault state of the vehicle based on the one or more operations at the inspection system, and determine a health score of the vehicle based on one or more of the state of the vehicle or the fault state of the vehicle.

Optionally, the one or more operations of the vehicle that are directed by the inspection system are one or more operations performed by the control system during movement of the vehicle one or more of prior to or subsequent to inspection of the vehicle by the inspection system Optionally, the fault state is indicative of one or more of a faulty system or a faulty component.

Optionally, the one or more processors are configured to diagnose the fault state as one or more of a faulty system or a faulty component of the vehicle, wherein diagnosing the one or more of the faulty system or the faulty component includes selecting a responsive action to implement from plural different responsive actions and implementing the responsive action that is selected from the plural different responsive actions.

In accordance with one aspect or example, an inspection system may include one or more sensors that may be selectively coupled to a vehicle during an inspection event and/or a maintenance event for the vehicle. A controller may be transferably coupled with a control system of the vehicle during the inspection and/or maintenance event. The controller may control one or more settings of the control system to initiate one or more of plural operations of the vehicle. The controller may determine whether first sensor information exists. The first sensor information may be indicative of a state of the vehicle during a time outside of the inspection and/or maintenance events. The controller may send a command signal to the control system to direct the control system of the vehicle to initiate a second operation of the vehicle responsive to determining that the first sensor information is lacking. The controller may obtain second sensor information from the one or more sensors based on the second operation of the vehicle, and determine a condition of the vehicle based on one or more of the first sensor information or the second sensor information.

Optionally, the second operation of the vehicle that is directed by the controller may be an operation that may be performed by the control system during the time outside of the inspection and/or maintenance events.

Optionally, the condition may be indicative of an operational state, a fault state, or a damaged state of one or more components of the vehicle.

Optionally, the controller may determine a health score of the vehicle based on the condition of the vehicle.

Optionally, the controller may one or more of autonomously or semi-autonomously determine the condition of the vehicle.

Optionally, the controller may control movement of the vehicle with the control system during the inspection and/or maintenance events for the vehicle.

Optionally, the controller may recommend a responsive action to implement from plural different responsive actions based on the condition of the vehicle.

Optionally, a first sensor may determine an operating characteristic of the vehicle, and a second sensor may determine an externality characteristic of the first sensor. The externality characteristic may be representative of one or more external conditions to which the first sensor is exposed.

Optionally, the controller may diagnose an operational state of the vehicle based on the operating characteristic of the vehicle or based on the externality characteristic of the first sensor.

In accordance with one aspect or example, a method may include selectively coupling one or more sensors to a vehicle during an inspection event and/or a maintenance event for the vehicle. A controller may be operably coupled with a control system of the vehicle during the inspection and/or maintenance event. The controller may control one or more settings of the control system to initiate one or more of plural operations of the vehicle. It may be determined whether first sensor information, indicative of a state of the vehicle during a time outside of the inspection and/or maintenance event exists. A command signal may be sent to the control system to direct the control system to initiate a second operation of the vehicle responsive to determining that the first sensor information is lacking. Second sensor information may be obtained from the one or more sensors based on the second operation of the vehicle. A condition of the vehicle may be determined based on one or more of the first sensor information or the second sensor information.

Optionally, the second operation of the vehicle that is directed by the controller may be an operation that may be performed by the control system during the time outside of the inspection and/or maintenance event.

Optionally, the method may include determining a health score of the vehicle based on the condition of the vehicle.

Optionally, determining the condition of the vehicle may be carried out by the controller one or more of autonomously or semi-autonomously.

Optionally, the method may include recommending a responsive action to implement from plural different responsive actions based on the condition of the vehicle.

Optionally, the method may include determining, with a first sensor, an operating characteristic of the vehicle, and determining, with a second sensor, an externality characteristic of the first sensor. The externality characteristic may be representative of one or more external conditions to which the first sensor is exposed.

Optionally, the method may include diagnosing an operational state of the vehicle based on one or more of the operating characteristic of the vehicle or the externality characteristic of the first sensor.

In accordance with one aspect or example, a system may include a first sensor that may detect first sensor information and determine an operating characteristic of a vehicle during a first operation of the vehicle based at least in part on the first sensor information. A control system of the vehicle may initiate the first operation of the vehicle. The first sensor information may be stored onboard or off-board the vehicle. A second sensor may detect second sensor information and determine one or more of an externality characteristic of the first sensor or an externality characteristic of the vehicle during the first operation of vehicle or during a second operation of the vehicle based at least in part on the second sensor information. A controller that is transferably coupled with the control system may initiate the second operation of the vehicle during an inspection and/or maintenance event. The first operation of the vehicle may occur at a time outside of the inspection and/or maintenance event. The controller may diagnose an operational state of the vehicle based on the operating characteristic of the vehicle, and based on the externality characteristic of the first sensor and/or the externality characteristic of the vehicle.

Optionally, the controller may be operable to cause the control system of the vehicle that controls operations of the vehicle to initiate the second operation of the vehicle. The controller may receive one or more of the first sensor information or the second sensor information to diagnose the operational state of the vehicle.

Optionally, the controller may determine a health score of the vehicle based on the operational state of the vehicle.

Optionally, the controller may select a responsive action to implement from plural different responsive actions based on the operational state of the vehicle.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An inspection system comprising:
  one or more sensors configured to be selectively coupled to a vehicle during one or more of an inspection event or a maintenance event for the vehicle; and a controller that is transferably coupled with a control system of the vehicle during the one or more of the inspection event or the maintenance event for the vehicle, the controller configured to control one or more settings of the control system to initiate one or more of plural operations of the vehicle, wherein the controller is configured to:
  determine whether first sensor information exists, the first sensor information indicative of a state of the vehicle during a time outside of the one or more of the inspection event or the maintenance event;
  send a command signal to the control system of the vehicle to direct the control system of the vehicle to initiate a second operation of the vehicle responsive to determining that the first sensor information is lacking;
  obtain second sensor information from the one or more sensors based on the second operation of the vehicle; and
  determine a condition of the vehicle based on one or more of the first sensor information or the second sensor information.

2. The inspection system of claim 1, wherein the second operation of the vehicle that is directed by the controller is an operation that may be performed by the control system during the time outside of the one or more of the inspection event or the maintenance event.

3. The inspection system of claim 1, wherein the condition is indicative of one or more of an operational state, a fault state, or a damaged state of one or more components of the vehicle.

4. The inspection system of claim 1, wherein the controller is configured to determine a health score of the vehicle based on the condition of the vehicle.

5. The inspection system of claim 1, wherein the controller is configured to one or more of autonomously or semi-autonomously determine the condition of the vehicle.

6. The inspection system of claim 1, wherein the controller is configured to control movement of the vehicle with the control system during the one or more of the inspection event or the maintenance event for the vehicle.

7. The inspection system of claim 1, wherein the controller is configured to recommend a responsive action to implement from plural different responsive actions based on the condition of the vehicle.

8. The inspection system of claim 1, wherein a first sensor of the one or more sensors is configured to determine an operating characteristic of the vehicle, and a second sensor of the one or more sensors is configured to determine an externality characteristic of the first sensor, wherein the externality characteristic is representative of one or more external conditions to which the first sensor is exposed.

9. The inspection system of claim 8, wherein the controller is configured to diagnose an operational state of the vehicle based on one or more of the operating characteristic of the vehicle or the externality characteristic of the first sensor.

10. A method comprising:
  selectively coupling one or more sensors to a vehicle during one or more of an inspection event or a maintenance event for the vehicle;
  operably coupling a controller with a control system of the vehicle during the one or more of the inspection event or the maintenance event for the vehicle, the controller configured to control one or more settings of the control system to initiate one or more of plural operations of the vehicle;
  determining whether first sensor information exists, the first sensor information indicative of a state of the vehicle during a time outside of the one or more of the inspection event or the maintenance event;
  sending a command signal to the control system to direct the control system to initiate a second operation of the vehicle responsive to determining that the first sensor information is lacking;
  obtaining second sensor information from the one or more sensors based on the second operation of the vehicle; and
  determining a condition of the vehicle based on one or more of the first sensor information or the second sensor information.

11. The method of claim 10, wherein the second operation of the vehicle that is directed by the controller is an operation that may be performed by the control system during the time outside of the one or more of the inspection event or the maintenance event.

12. The method of claim 10, further comprising determining a health score of the vehicle based on the condition of the vehicle.

13. The method of claim 10, wherein determining the condition of the vehicle is carried out by the controller one or more of autonomously or semi-autonomously.

14. The method of claim 10, further comprising recommending a responsive action to implement from plural different responsive actions based on the condition of the vehicle.

15. The method of claim 10, further comprising determining, with a first sensor of the one or more sensors, an operating characteristic of the vehicle, and determining, with a second sensor of the one or more sensors, an externality characteristic of the first sensor, wherein the externality characteristic is representative of one or more external conditions to which the first sensor is exposed.

16. The method of claim 15, further comprising diagnosing an operational state of the vehicle based on one or more of the operating characteristic of the vehicle or the externality characteristic of the first sensor.

17. A system comprising:
  a first sensor configured to detect first sensor information and determine an operating characteristic of a vehicle during a first operation of the vehicle based at least in part on the first sensor information, a control system of the vehicle configured to initiate the first operation of the vehicle, the first sensor information stored onboard or off-board the vehicle; and
  a second sensor configured to detect second sensor information and determine one or more of an externality characteristic of the first sensor or an externality characteristic of the vehicle during one or more of the first operation of the vehicle or a second operation of the vehicle based at least in part on the second sensor information, wherein a controller that is transferably coupled with the control system is configured to initiate the second operation of the vehicle during one or more of an inspection event or a maintenance event, the first operation of the vehicle configured to occur at a time outside of the one or more of the inspection event or the maintenance event, and
  wherein the controller is configured to diagnose an operational state of the vehicle based on the operating characteristic of the vehicle and based on the one or more of the externality characteristic of the first sensor or the externality characteristic of the vehicle.

18. The system of claim 17, wherein the controller is operable to cause the control system of the vehicle that controls operations of the vehicle to initiate the second operation of the vehicle, wherein the controller is configured to receive one or more of the first sensor information or the second sensor information to diagnose the operational state of the vehicle.

19. The system of claim 17, wherein the controller is configured to determine a health score of the vehicle based on the operational state of the vehicle.

20. The system of claim 17, wherein the controller is configured to select a responsive action to implement from plural different responsive actions based on the operational state of the vehicle.

* * * * *